(12) United States Patent
Manolio

(10) Patent No.: US 9,829,104 B2
(45) Date of Patent: Nov. 28, 2017

(54) DEVICE FOR THE SELECTION AND THE DISPLACEMENT OF ACTUATION MEMBERS OF A GEARBOX FOR MOTOR-VEHICLES

(71) Applicant: Fiat Group Automobiles S.p.A., Turin (IT)

(72) Inventor: Salvatore Manolio, Turin (IT)

(73) Assignee: Fiat Group Automobiles S.p.A., Turin (IT)

( * ) Notice: Subject to any disclaimer, the term of this patent is extended or adjusted under 35 U.S.C. 154(b) by 197 days.

(21) Appl. No.: 14/871,077

(22) Filed: Sep. 30, 2015

(65) Prior Publication Data

US 2016/0097452 A1 Apr. 7, 2016

(30) Foreign Application Priority Data

Oct. 3, 2014 (IT) .............................. TO2014A0791

(51) Int. Cl.
| | | |
|---|---|---|
| B60K 20/00 | (2006.01) | |
| F16H 63/08 | (2006.01) | |
| F16H 63/30 | (2006.01) | |
| F16H 63/34 | (2006.01) | |
| F16H 63/36 | (2006.01) | |

(52) U.S. Cl.
CPC ........... *F16H 63/08* (2013.01); *F16H 63/302* (2013.01); *F16H 63/3408* (2013.01); *F16H 63/36* (2013.01); *F16H 2063/3086* (2013.01)

(58) Field of Classification Search
CPC .... F16H 63/08; F16H 63/302; F16H 63/3408; F16H 63/36; F16H 2063/3086
See application file for complete search history.

(56) References Cited

U.S. PATENT DOCUMENTS

| | | | | |
|---|---|---|---|---|
| 4,476,738 A | * | 10/1984 | Haga ...................... | F16H 63/20 74/473.26 |
| 4,476,739 A | * | 10/1984 | Arai ....................... | F16H 63/20 74/473.26 |
| 6,026,702 A | * | 2/2000 | Dreier .................... | F16H 63/206 74/473.21 |
| 6,745,878 B1 | * | 6/2004 | Jensen .................... | F16H 63/34 192/3.61 |
| 6,845,685 B2 | * | 1/2005 | Brandwitte ............ | F16H 63/206 74/473.25 |
| 7,162,934 B2 | * | 1/2007 | Fanning ................. | F16H 63/206 74/473.25 |

(Continued)

FOREIGN PATENT DOCUMENTS

| | | | |
|---|---|---|---|
| EP | 2372197 | 3/2012 | |
| EP | 2711592 A1 * | 3/2014 | ........... F16H 63/302 |
| EP | 2711592 | 5/2015 | |

OTHER PUBLICATIONS

Search Report for Italian Patent Application No. TO2014A000791 dated Jun. 8, 2015, 2 pages.

*Primary Examiner* — Zakaria Elahmadi
(74) *Attorney, Agent, or Firm* — RMCK Law Group, PLC

(57) ABSTRACT

The invention regards a device for the selection and the displacement of actuation members of a gearbox for motor vehicles that comprises a plurality of forward gear ratios and a reverse gear ratio, each associated to a respective actuation member. The device includes a mechanism for the assistance to the engagement of the reverse gear.

15 Claims, 21 Drawing Sheets

(56) References Cited

U.S. PATENT DOCUMENTS

| | | | | |
|---|---|---|---|---|
| 7,963,187 B2* | 6/2011 | Goras | ...................... | F16H 63/38 74/473.26 |
| 2008/0302199 A1* | 12/2008 | Shintani | ................ | F16H 61/688 74/473.12 |
| 2008/0305928 A1* | 12/2008 | Shintani | ................ | F16H 61/688 477/115 |
| 2009/0211389 A1* | 8/2009 | Shintani | ................ | F16H 61/688 74/473.24 |
| 2010/0126294 A1* | 5/2010 | Shintani | ................ | F16H 61/688 74/473.36 |

* cited by examiner

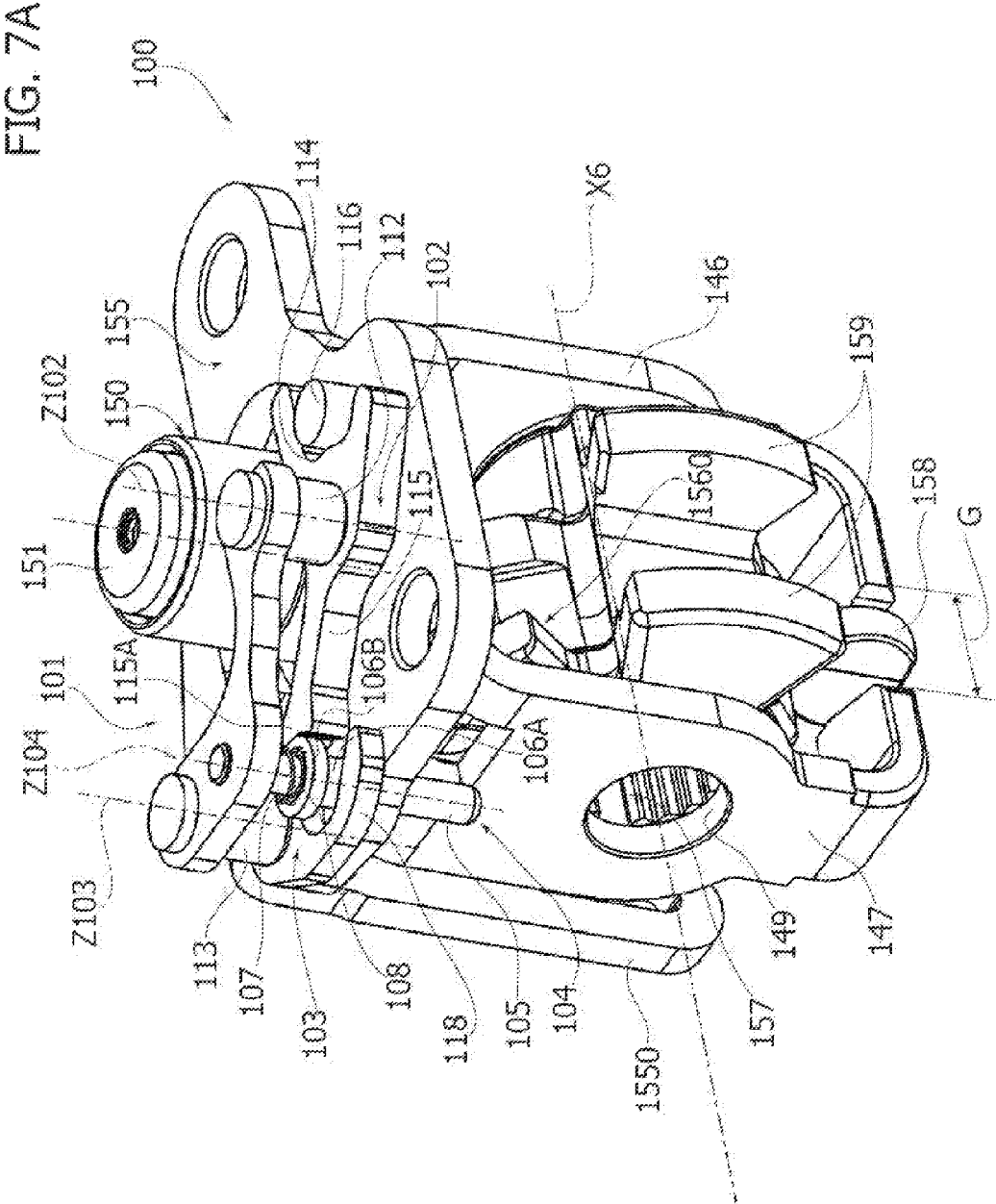

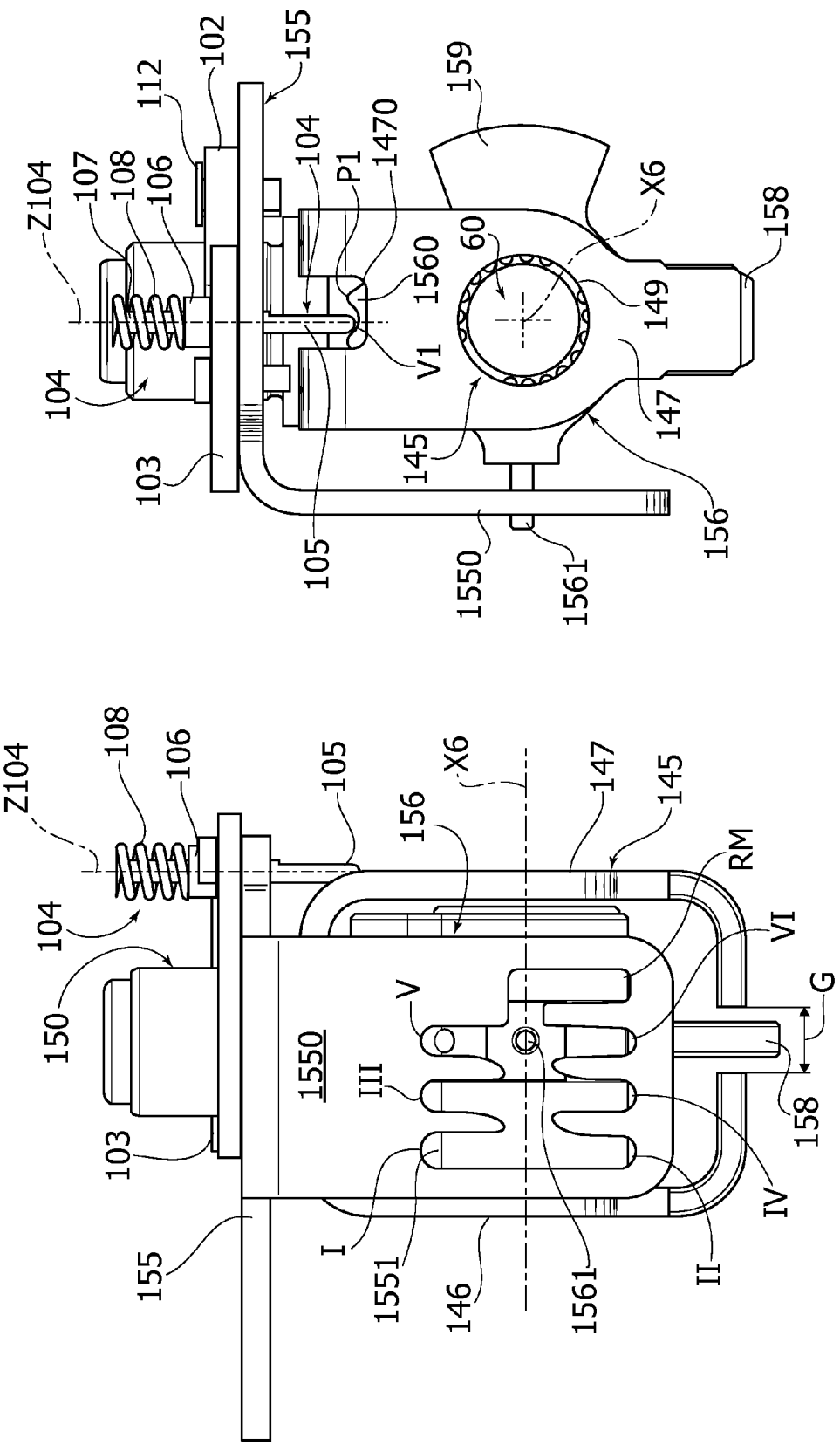

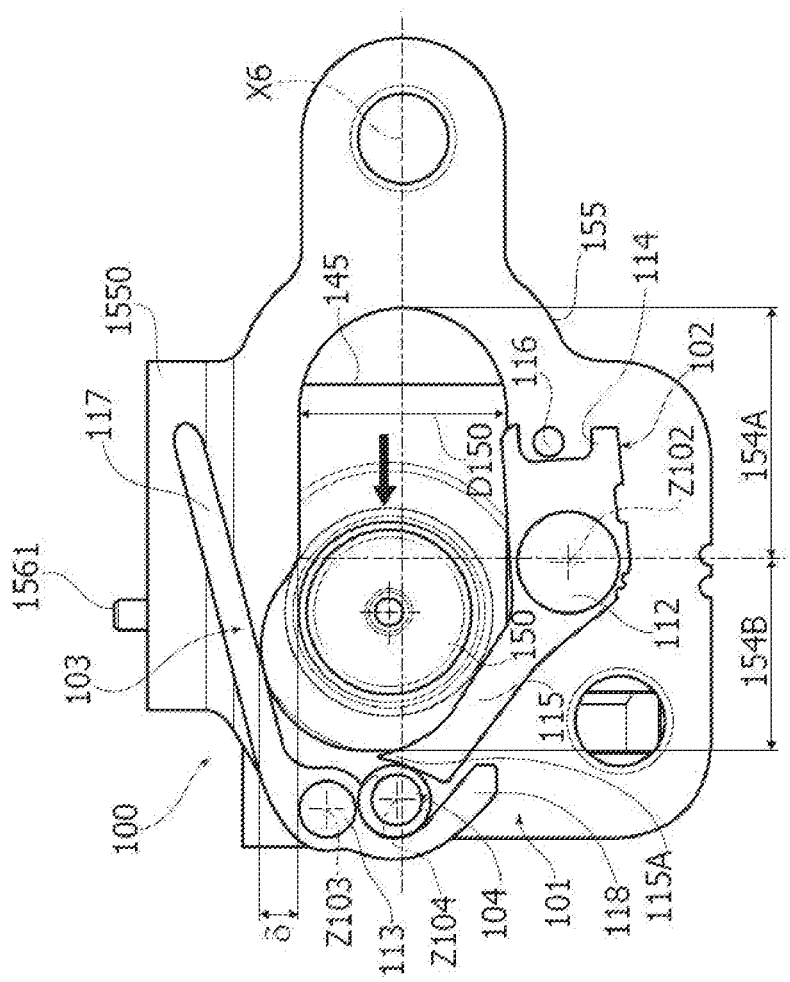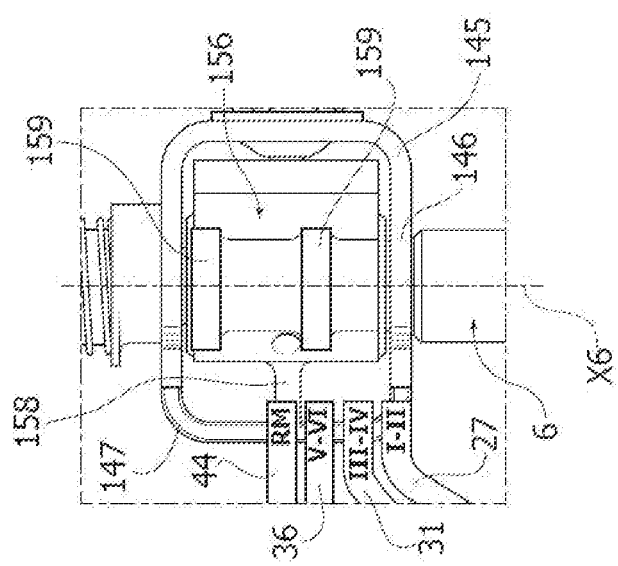

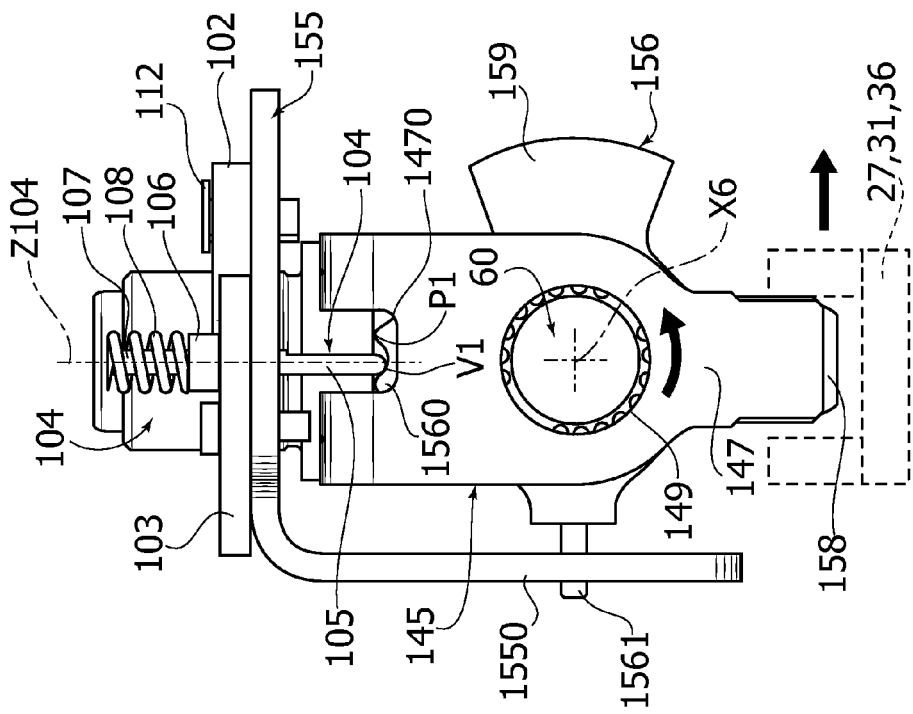
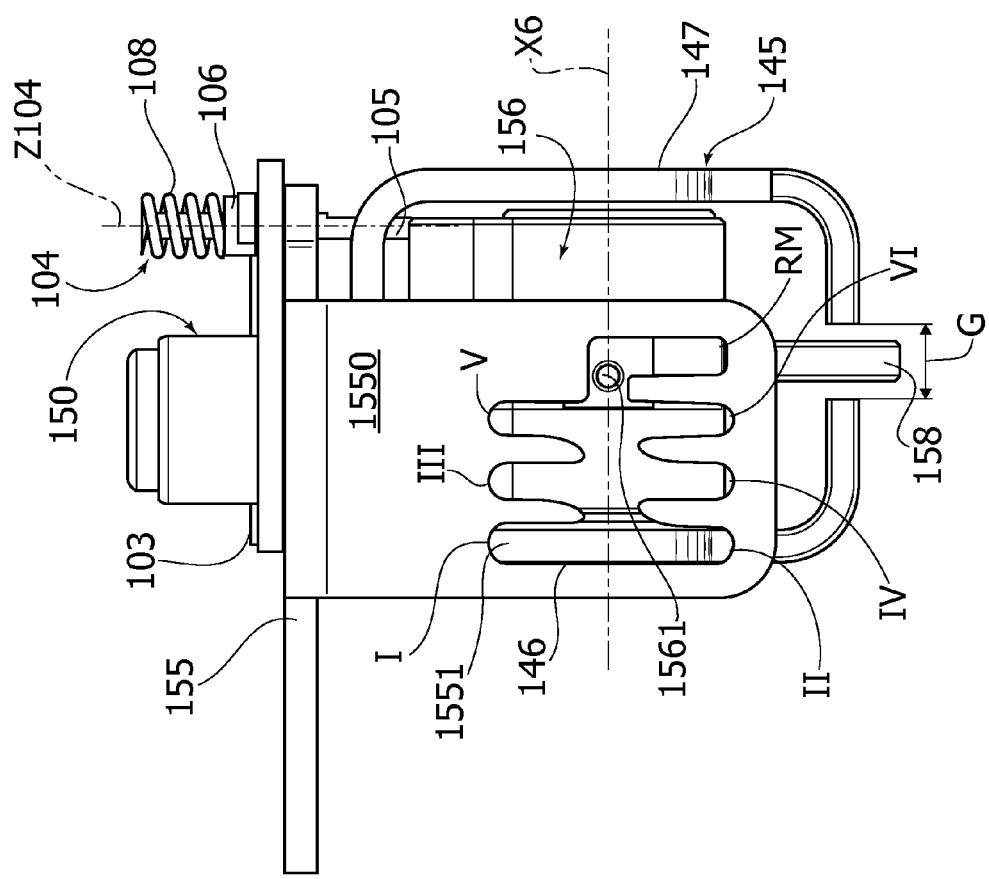

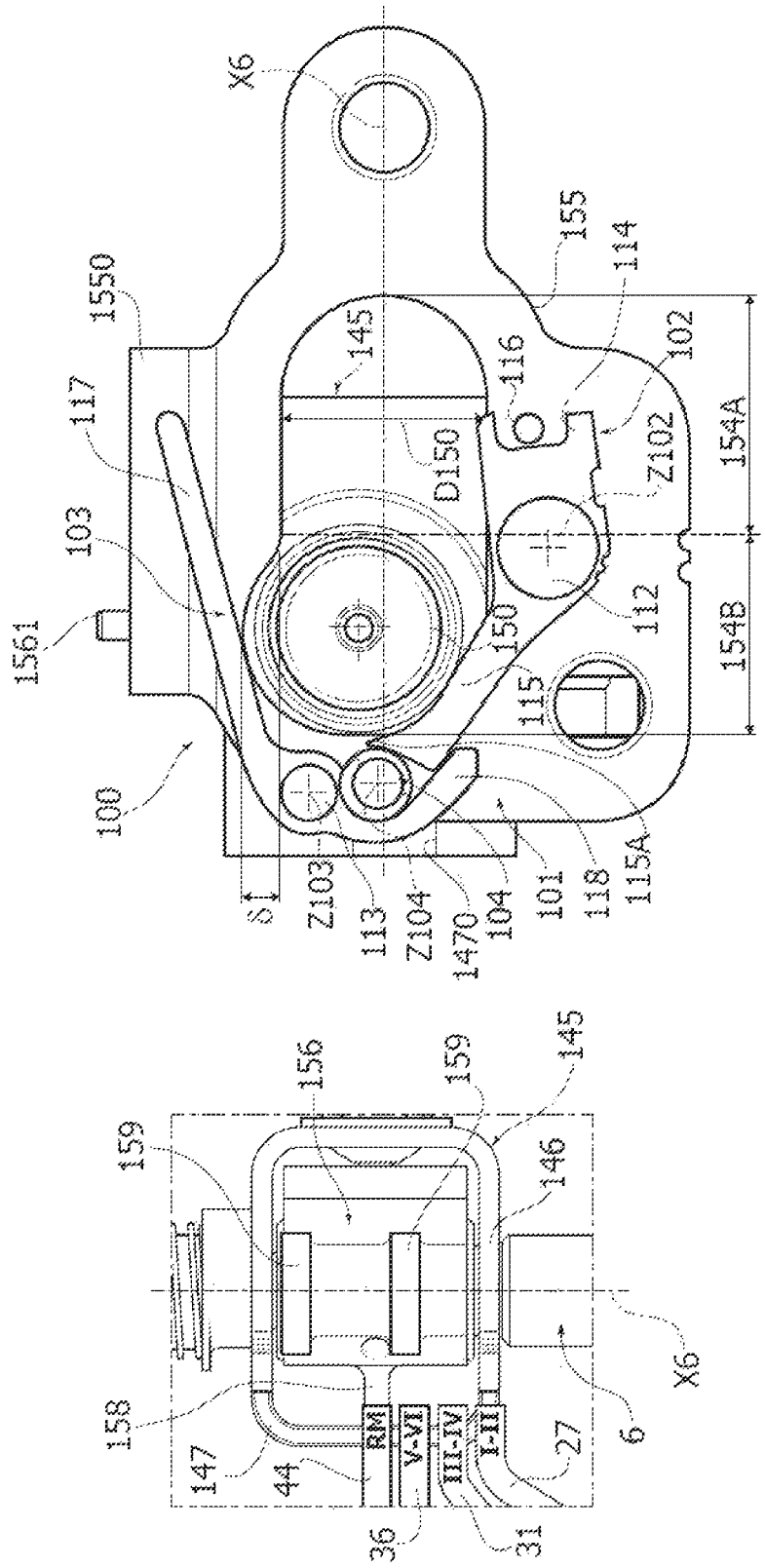

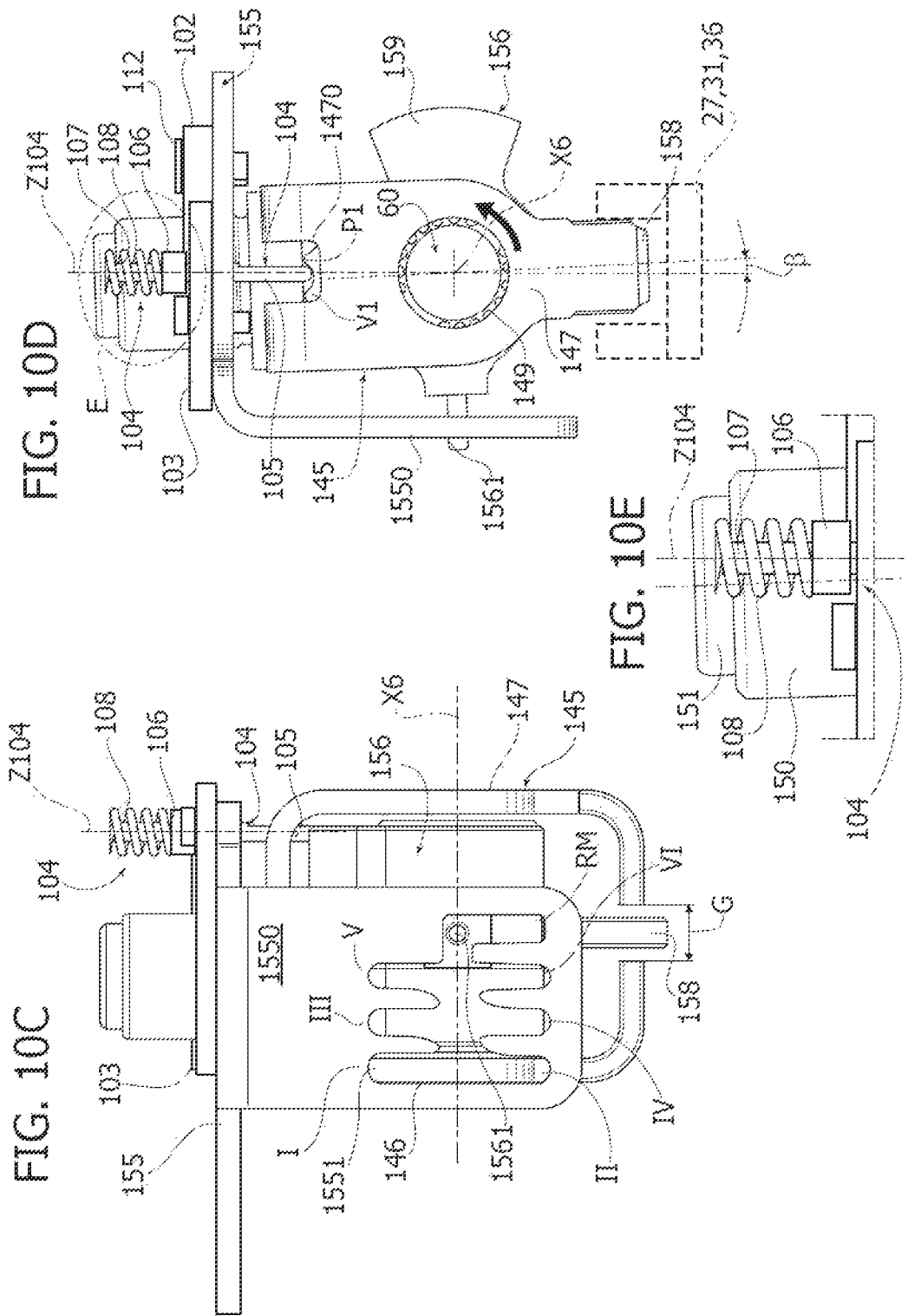

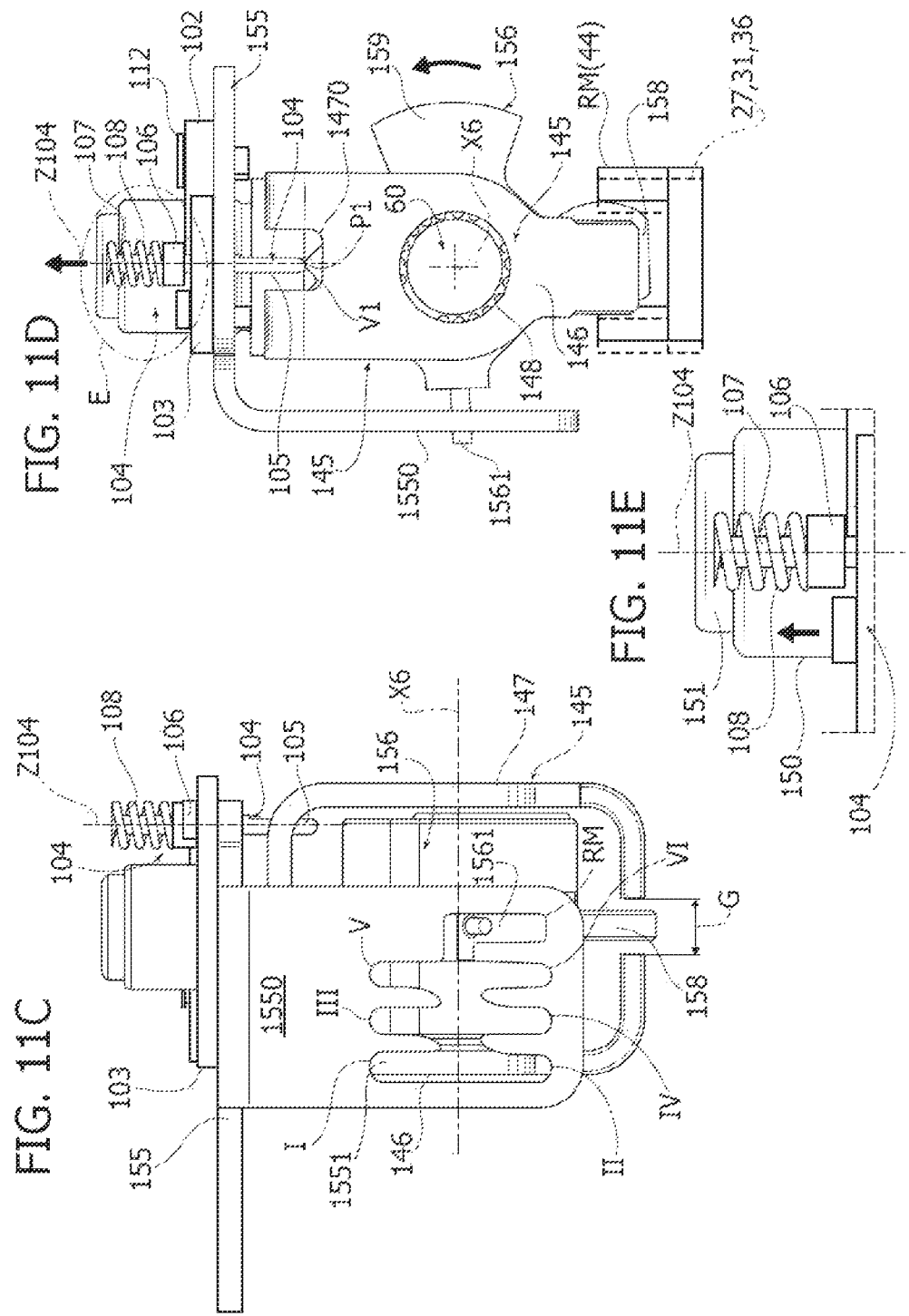

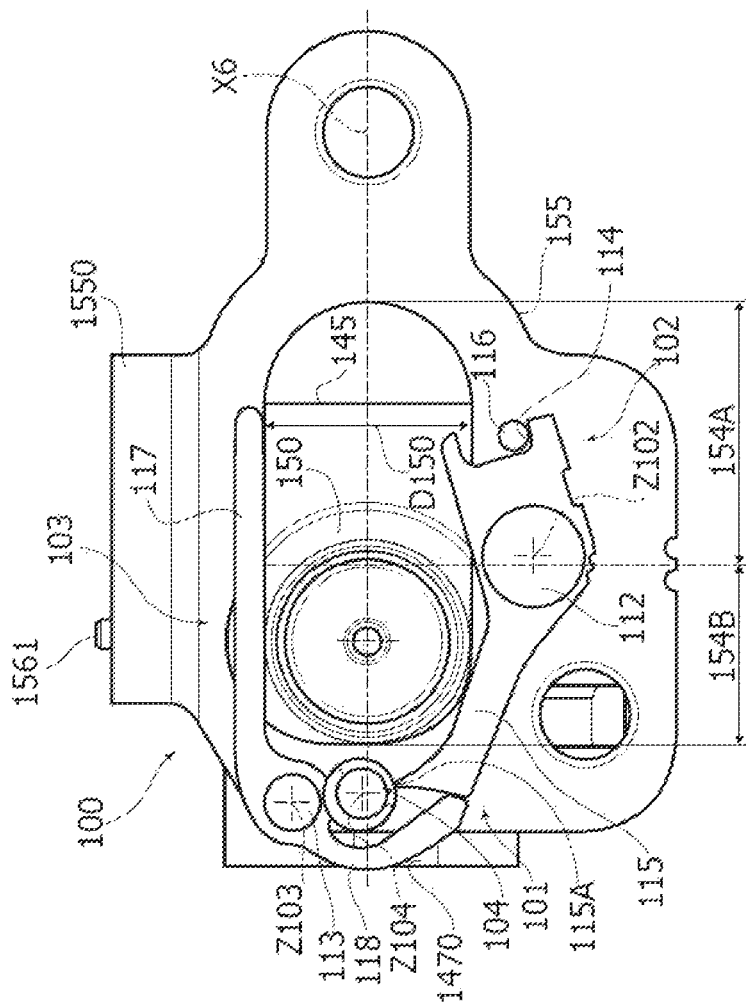
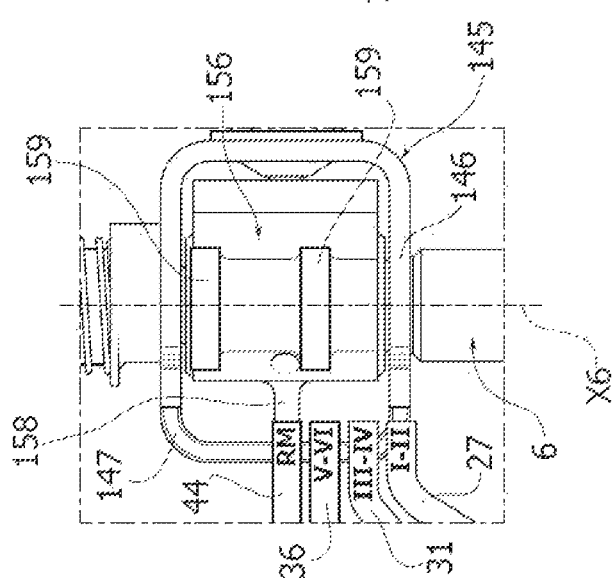

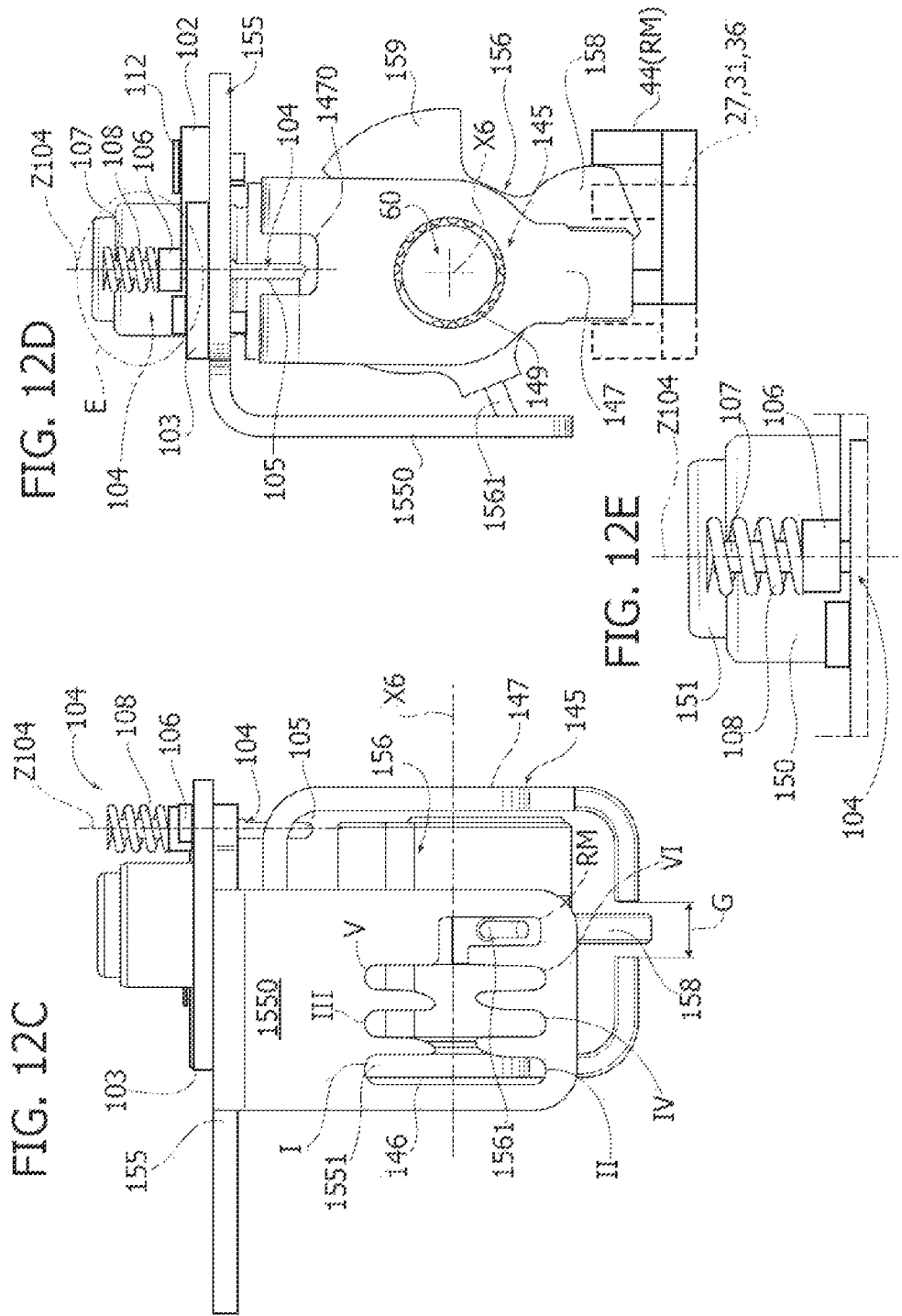

DEVICE FOR THE SELECTION AND THE DISPLACEMENT OF ACTUATION MEMBERS OF A GEARBOX FOR MOTOR-VEHICLES

CROSS REFERENCE TO RELATED APPLICATIONS

This application claims priority to Italian Patent Application No. TO2014A000791 filed on Oct. 3, 2014, the entire disclosure of which is incorporated herein by reference.

FIELD OF THE INVENTION

The present invention relates to a device for the selection and the displacement of actuation members of a gearbox for motor vehicles comprising a plurality of forward gear ratios and a reverse gear ratio each associated to a respective actuation member, the device comprising:
- a selection mask having a pair of fingers opposite to one another and facing one another and a pair of through holes provided on said fingers and having axes which are coaxial and which define a main axis,
- an engagement hub inserted between said fingers in a manner coaxial to said through holes, said engagement hub having an engagement finger configured for engaging with said actuation members and being rotatable around said main axis,
- a control shaft inserted within said through holes and into said engagement hub, said control shaft being rotatable around said main axis and axially movable along the latter, said control shaft being furthermore connected in rotation to said engagement hub,
- a first control member connected in rotation to said control shaft and operable to cause a rotation of said engagement hub around said main axis to selectively displace each actuation member towards an extreme position thereof,
- a second control member operatively connected to said engagement hub and operable to cause a translation of said engagement hub and said selection mask along said main axis to select the actuation member wherein said engagement finger is to be engaged,
- a mechanism for the assistance to the engagement of the reverse gear that can be activated when said engagement hub is translated to engage the engagement fingers into the actuation member of said reverse gear,
- guide means defining a guide path for said selection mask and configured to guide the selection mask so that the latter does not follow the rotation of the control shaft and of the engagement hub when a gear is engaged.

General Technical Problem and Description of the Prior Art

With reference to FIGS. 1 to 5, number 1 designates a device of a known type for selecting and displacing actuation members of a motor-vehicle gearbox. The device 1 is contained within a casing 2 that is installed on the housing 3 of a gearbox 4.

With reference to FIG. 2, the gearbox 4, here represented in an exemplary embodiment, comprises a primary shaft 5 and a secondary shaft 6, which rotate about respective axes X1 and X2. Each shaft comprises a plurality of gear wheels, which are mounted idle on, or are rigidly connected in rotation to, the shaft. The primary shaft 5 comprises three gear wheels 7, 8, 9 rigidly connected in rotation thereto, and three gear wheels 10, 11, 12 mounted idle thereon.

Mounted between the gear wheels 10 and 11 is a first synchronizer 13 rigidly connected in rotation to the primary shaft 5. A second synchronizer 14, which is also connected in rotation to the shaft 5, is mounted adjacent to the gear wheel 12 and is associated thereto.

The secondary shaft 6 comprises four gear wheels 15, 16, 17, 18, connected in rotation thereto, and two gear wheels 19, 20, mounted idle. Installed between the gear wheels 19, 20 is a third synchronizer 21, which is connected in rotation to the shaft 6 and moreover carries a gear wheel 22, connected in rotation to the synchronizer 21 and to the shaft 6.

With reference to FIG. 3, the gearbox 4 further comprises a shaft 23, which has an axis X3 parallel to the axes X1 and X2 and carries an idle gear 24, which is axially mobile along the shaft 23 itself.

In this way, there are defined five gears, corresponding to as many forward gears of the gearbox 4, and one gear corresponding to a reverse gear of the gearbox 4 itself. In particular, the five gears of the gearbox 4 comprise:
- a first gear ratio I, which is defined by the pair of gear wheels 7, 20 that mesh with one another and corresponds to a first forward gear of the gearbox 4 (referred to hereinafter also as "first gear ratio", "first gear", or simply "first");
- a second gear ratio II, which is defined by the pair of gear wheels 9 and 19 that mesh with one another and corresponds to a second forward gear of the gearbox 4 (referred to hereinafter also as "second gear ratio", "second gear", or simply "second");
- a third gear ratio III, which is defined by the pair of gear wheels 10 and 16 that mesh with one another and corresponds to a third forward gear of the gearbox 4 (referred to hereinafter also as "third gear ratio", "third gear", or simply "third");
- a fourth gear ratio IV, which is defined by the pair of gear wheels 11 and 17 that mesh with one another and corresponds to a fourth forward gear of the gearbox 4 (referred to hereinafter also as "fourth gear ratio", "fourth gear", or simply "fourth"); and
- a fifth gear ratio V, which is defined by the pair of gear wheels 12 and 18 that mesh with one another and corresponds to a fifth forward gear of the gearbox 4 (referred to hereinafter also as "fifth gear ratio", "fifth gear", or simply "fifth").

The gear corresponding to the reverse gear is, instead, designated by RM (and is referred to hereinafter also as "reverse gear ratio" or simply "reverse gear") and is defined by the pair of gear wheels 8 and 22 and by the idle gear wheel 24 when the latter meshes with the above gear wheels. In fact, the gear wheels 8 and 22 do not mesh directly with one another, but require the idle gear wheel 24 to be axially displaced so as to mesh with both for there to be transmission of motion from one gear wheel to another.

With reference to FIGS. 2 and 3, a first fork 25 is engaged on the first synchronizer 21 and is integral with a first actuation member 26, which comprises a fork-shaped end 27. The first actuation member 26 is slidably mounted on a shaft 28 carried by the gear housing 3 and movable along an axis X4 thereof.

A second fork 29 is engaged on the first synchronizer 13 and is integral with a second actuation member 30, which is also slidably mounted on the shaft 28 and comprises a fork-shaped end 31 substantially identical to the end 27 and set alongside it and aligned therewith (FIG. 3).

A third fork 32 is rigidly connected to the shaft 28 by means of a bushing 33 and a pin 34. A third actuation member 35, operatively connected to the fork 32, engages on the shaft 28 itself. The actuation member 35 comprises a fork-shaped end 36, which is substantially identical to the fork-shaped ends 27, 31 and is set alongside the end 31 and aligned therewith.

A fourth fork 37 is engaged on the idle gear wheel 24 and is rotatable about an axis X5. The fork 37 is connected in rotation to a pin 38 coaxial to the axis X5 and is carried by a fork-shaped bracket 39 fixed to the gear housing 3. The pin 38 is moreover connected in rotation to a lever 40, which is in turn connected to a fourth actuation member 41 by means of a pin 42 with spherical head 43 engaged in the lever 40. Like the other actuation members, also the actuation member 41 comprises a fork-shaped end 44, which is set alongside the fork-shaped end 36 and aligned therewith.

With reference to FIG. 5, the actuation device 1 includes a selection mask 45 comprising two fingers 46, 47 opposite to and facing one another. The fingers 46, 47 are substantially L-shaped, convergent, and have ends separated by a distance G. The distance G has dimensions comparable to, but slightly greater than, a thickness P of the fork-shaped ends 27, 31, 36, 44. A pair of through holes 48, 49 is provided in the fingers 46, 47 (one hole in each of the fingers).

Moreover fixed to the selection mask 45 is a stud 50, comprising a bushing 51 containing a pin 52 with a head that withholds a retractile ball 53 projecting between the fingers 46, 47. The stud 50 is engaged within an eyelet 54 provided in a plate 55 fixed to the casing 2.

The plate 55 is fixed in translation and in rotation with respect to the casing 2, and the eyelet 54 has an oblong shape extending in the direction of the main axis X6. The plate 55 has the function of guide means for the selection mask 45 by defining via the eyelet 54 a guide path that develops in the direction of the main axis X6.

The device 1 further comprises a first engagement hub 56 having a substantially cylindrical shape. The engagement hub 56 is inserted between the fingers 46, 47, coaxially with respect to the through holes 48, 49, and comprises a female splined coupling 57 coaxial with the holes 48, 49 and coaxial to the main axis X6.

The engagement hub 56 comprises an engagement finger 58 provided for engaging with the actuation members 26, 30, 35, 41, in particular with the respective fork-shaped ends 27, 31, 36, 44. The engagement finger 58 is set between the two fingers 46, 47 in the area that separates the ends thereof, and consequently has a thickness slightly smaller than the distance G.

The engagement hub 56 further comprises a pair of radial shoulders 59, substantially orthogonal to the engagement finger 58, and a groove, with a cylindrical wall 59A, within which the retractile ball 53 engages.

The device 1 comprises a control shaft 60 including a first stretch 61, a second stretch 62, which bears a male splined coupling 63, and a third stretch 64. The stretches 61 and 64 are end stretches of the shaft 60 and have a different diameter; in particular, the diameter of the stretch 61 is smaller than the diameter of the stretch 64.

The control shaft 60 shares the axis X6 and is inserted into the through holes 48, 49 and into the hub 56. In particular, the male splined coupling 63 is engaged in the female splined coupling 57 of the hub 56. The control shaft 60 is axially blocked with respect to the selection mask 45 thanks to the stretch 64, which has a diameter greater than that of the through holes 48, 49, and thanks to an elastic ring 65 engaged in an annular groove 66 in the first stretch 61.

The control shaft 60 is moreover rotatably supported so that it can turn about the axis X6 within the casing 2 and is moreover axially movable along the axis X6.

Two bushings 67, 68 are fitted on the stretches 61, 64, respectively, and are kept bearing upon the finger 47 and the finger 46, respectively, by springs 69, 70 that share the axis X6, are fitted on the control shaft 60, and are comprised between the corresponding bushings and recesses 71, 72 provided on the casing 2.

With reference to FIGS. 5 and 6, the device 1 comprises a first control member 73, in particular a rocker, which is connected in rotation to the control shaft 60 and is rotatable about the axis X6. Fixed to the control member 73 is a pin with spherical head 74, provided for connection to a metal cable of a Bowden type in turn connected to an actuation lever inside the motor vehicle).

The device 1 further comprises a second control member 75, in particular a rocker, which is rotatable about an axis Z1 orthogonal to the axis X6.

The control member 75 comprises a pin with spherical head 76 that can be connected to a Bowden cable, which is in turn connected to the actuation lever inside the motor vehicle. With reference in particular to FIGS. 2 and 6, the control member 75 is connected in rotation, by means of a pin 76A, to a lever 77, which is also rotatable about the axis Z1 and has an end 78 with rounded sides 79 that engages between the radial shoulders 59 of the first engagement hub 56.

Moreover connected to the gearbox 4 are the following components:
  a clutch, connected in rotation to the primary shaft 5 (not illustrated) that receives motion from an engine of the motor vehicle (not illustrated either); and
  a differential 80, comprising a crown wheel 81, which meshes with the gear wheel 15 of the secondary shaft 6.

Moreover connected to the differential 80 by means of respective constant-velocity joints 84, 85 are two semi-axles 82, 83.

Operation of the gearbox 4 is described in what follows.

The gearbox 4 is provided for transmission of motion from the primary shaft 5 to the differential 80 through the secondary shaft 6, with a variable transmission ratio. Variation of the transmission ratio is possible by actuating the forks 25, 29, 32 via the respective actuation members 26, 30, 35 associated to the gear ratios I-II, III-IV, V, respectively.

Hence, they govern engagement of the forward gears of the gearbox 4. Engagement of the reverse gear RM is obtained by operation of the actuation member 41, which causes axial displacement of the gear wheel 24 along the shaft 23.

The forks cause axial displacement of corresponding sleeves of the synchronizers, on which they are engaged for connecting in rotation the corresponding idle gears with the shaft on which the latter are mounted.

The device 1 is designed for operation of the individual actuation members via the engagement finger 58 that can be engaged selectively in the fork-shaped ends 27, 31, 36, 44.

The actuation members 26, 30, 35, 41 have the respective fork-shaped ends 27, 31, 36, 44 parallel and aligned to one another. Each actuation member and each fork-shaped end is associated to gear ratios that belong to one and the same engagement plane.

In the present description, the term "engagement plane" defines a plane along which each actuation member 26, 30, 35, 41 is movable. In the example illustrated in the figures, the gearbox 4 has four engagement planes. In the present description, the term "selection movement" defines a movement of the first hub 56 aimed at selecting the engagement plane to which the fork-shaped end in which the engagement finger 58 is to be engaged belongs. In addition, the term "engagement movement" defines a movement of the engagement hub 56 aimed at moving one of the actuation members 26, 30, 35, 41 towards an extreme position thereof in a direction parallel to the axis X6.

The selection and engagement movements are governed, respectively, by the second control member 75 and by the first control member 73. In particular, the first control member 73 may be driven in rotation about the axis X6 for causing corresponding rotation of the control shaft 60 and of the engagement hub 56 (thanks to the coupling between the splined couplings 63, 57) for displacing an actuation member towards an extreme position thereof, i.e., a position such that the synchronizer associated thereto connects in rotation to the shaft on which an idle gear is mounted. In the absence of an action on the control member 73, the engagement hub 56 is moreover kept in a neutral position by means of the coupling, which can be disengaged at upon rotation thereof, between the groove 57A and the retractile spherical head 53.

It is hence evident that each actuation member has a number of extreme positions that depends upon the number of gear wheels associated to a single synchronizer. In particular, the actuation members 26, 30 have two extreme positions, each corresponding to synchronization of the gear ratio I and of the gear ratio II and to synchronization of the gear ratio III and of the gear ratio IV, respectively.

The actuation members 35, 41 each have just one admissible extreme position, corresponding, respectively, to synchronization of the gear ratio V and to displacement of the gear wheel 24 along the shaft 23 to enable meshing thereof with the gear wheels 8, 22.

The second control member 75 can, instead, be driven in rotation about the axis Z1 for causing, via the lever 77 engaged between the radial shoulders 59, a translation of the engagement hub 56 and of the selection mask 45 along the axis X6. In this way, it is possible to select the engagement plane, i.e., to select the actuation member in which to engage the engagement finger 58. The selection mask 45 translates together with the control shaft but does not turn on account of the stud 50 that engages in the eyelet 54. In general, the plate 55 is configured for guiding the selection mask—during the movements of selection—along the guide path defined by the eyelet 54 in such a way that the selection mask 45 does not follow the rotation of the control shaft 6 and of the engagement hub 56 when a gear is engaged.

It should moreover be noted that, irrespective of the position in which the selection movement terminates, the engagement finger 58 can move one and only one actuation member. In fact, also the fingers 46, 47 are engaged in the fork-shaped ends 27, 31, 36, 44 in a way that depends upon the position of the mask 45.

On account of the ratio existing between the distance G and the thickness P, only one fork-shaped end at a time can move between the fingers 46, 47, which in this way inhibit any movement of the actuation members that have fork-shaped ends belonging to engagement planes that have not been selected. The fingers 46, 47 substantially block the motion of the actuation members, in the fork-shaped ends of which they are engaged, enabling only the motion of the actuator, the fork-shaped end of which is engaged with the engagement finger 58, thus occupying a position in the area of separation between the ends of the fingers 46, 47.

Gearboxes with an actuation device of a known type, such as the device 1, present, however, a problem linked to engagement of the reverse gear.

The reverse gear RM is the only gear, among the gears of the gearbox 4, that does not have gear wheels that are always meshing with one another since it is designed to carry out reversal of the direction of the motion transmitted to the axle shafts 83, 82 and to the gear wheels of the vehicle.

In particular, at the moment of engagement of the reverse gear it is not infrequent to perceive a squealing metallic noise on account of difficulties in meshing of the gear wheel 24 with the gear wheels 8, 22.

In fact, by engaging the reverse gear in conditions where the vehicle is stationary there may exist a difference of speed of rotation between the shafts 5, 6. In particular, the secondary shaft 6 is stationary since it is connected, through the differential 80, to the wheels of the vehicle, which are stationary.

The primary shaft 5, however, may not be completely stationary for various reasons, for example for reasons linked to its own inertia. This means that the gear wheel 8, connected in rotation to the shaft 5, is moving and consequently is not in optimal conditions for meshing with the gear wheel 24.

The above meshing takes place axially, and it is consequently an indispensable condition to have the gear wheels 22, 8 perfectly stationary.

This problem has been tackled and solved in various ways in the framework of the prior art. Examples of solutions to this technical problem may be found in the documents Nos. U.S. Pat. No. 6,736,020 B2 and DE 197 31 011 A1.

The present applicant has over the years proposed various solutions to the above technical problem, for example in the documents Nos. EP 2 372 197 B1 and IT 1379759 B.

A common technical problem in the creation of devices of the type described above consists in the need to minimize the adaptations to be made on components already existing and under production for installation of the system that ensures braking of the primary shaft 5 upon engagement of the reverse gear.

The inventors have noted that the aforementioned solutions can all be improved upon from the standpoint of design in order to minimize the impact (and consequently the implementation costs) on existing components.

For instance, the solutions of the documents Nos. U.S. Pat. No. 6,736,020 B2 and DE 197 31 011 A1 are both characterized by the need for additional and very specific machining processes to be carried out on the components such as to render wide-scale implementation on existing gearboxes in practice disadvantageous.

The solution proposed by the present applicant in the document No. IT 1379759 B, for example, albeit effective, is characterized by the use of a relatively complex mechanism, which is moreover located in a position that is difficult to access from outside in the case of malfunctioning.

Also the solution of the document No. EP 2 372 197 B1, albeit effective, envisages the use of further components that render necessary execution of interventions on a number of components.

OBJECT OF THE INVENTION

The object of the present invention is to overcome the problems of the prior art described previously. In particular, the object of the present invention is to provide a device for operating actuation members of a gearbox that will be able to eliminate the problems of engagement of the reverse gear illustrated previously and will enable at the same time installation on any gearbox, minimizing the impact on the characteristics of the latter, in particular—at the same time—minimizing the number of components involved in the modification and preventing positioning of the device itself in areas of the gearbox that are hard to access.

SUMMARY OF THE INVENTION

The object of the invention is achieved by an actuation device having the features forming the subject of one or more of the ensuing claims, which form an integral part of the technical teaching provided herein in relation to the invention.

In particular, the object of the present invention is achieved by an actuation device having all the features listed at the beginning of the present description and moreover characterized in that said mechanism for assistance includes:
a first operative configuration wherein it is configured for setting up a deviation of the guide path so that during an axial travel of the engagement finger towards an extreme position preliminary to the engagement of the reverse gear the selection mask is forced to be temporarily displaced in a rotated position, wherein one of the fingers of the selection mask actuates at least one of the actuation members of the forward gears of the gearbox, so as to cause a halt of the rotation of the primary shaft of the gearbox and accordingly allow a subsequent regular and silent engagement of the reverse gear, and
a second operating configuration wherein it is configured for recalling said selection mask from said rotated position.

BRIEF DESCRIPTION OF THE DRAWINGS

The invention will now be described with reference to the annexed drawings, which are provided purely by way of non-limiting example and wherein:

FIG. 7A is a perspective view of the actuation device of FIG. 7 in an assembled condition;

FIGS. 8A-8D, 9A-9D, 10A-10E, 11A-11E, 12A-12E, 13A-13E illustrate an operating sequence of the actuation device according to the present invention.

DETAILED DESCRIPTION OF THE INVENTION

Figure 7:
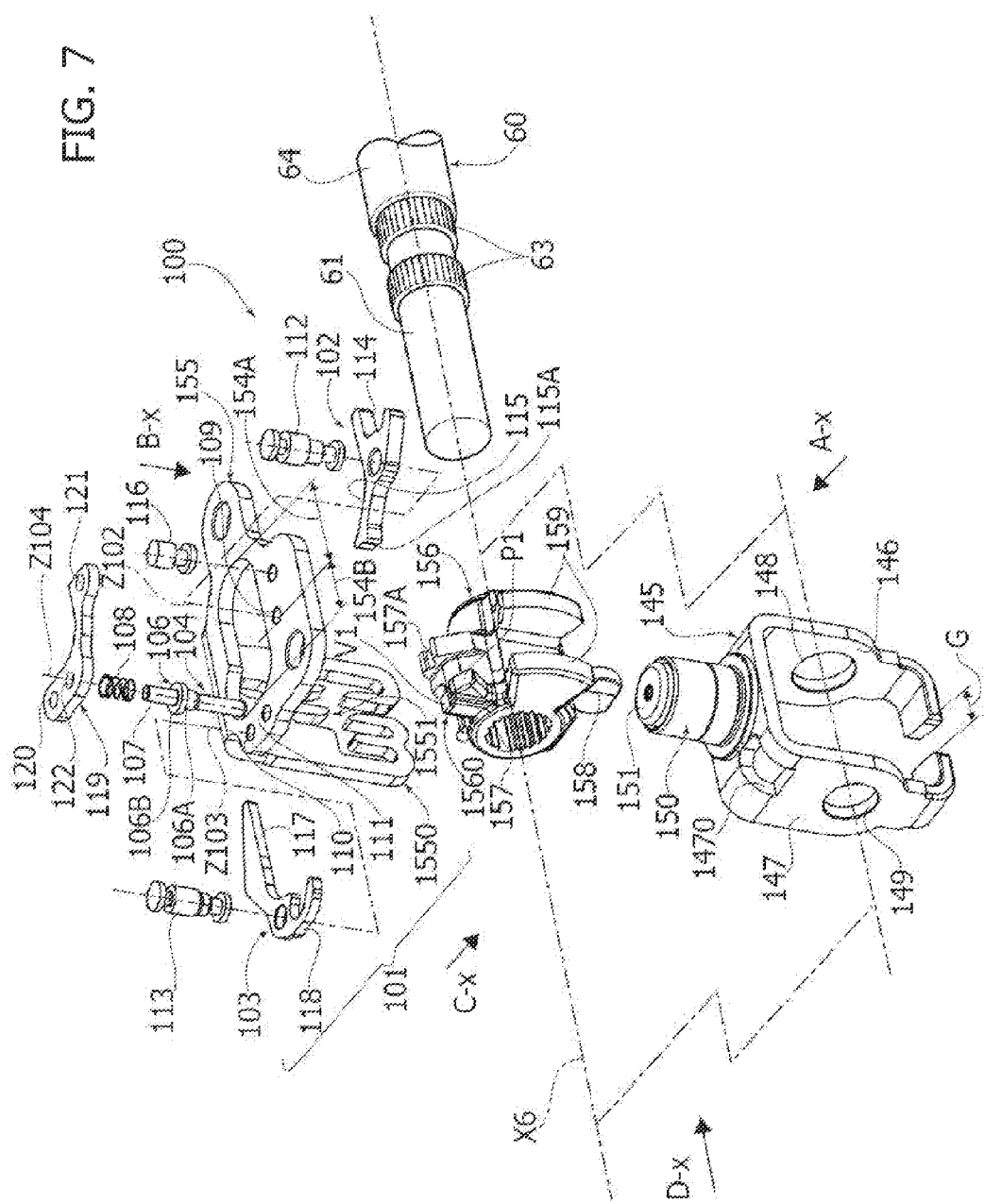
FIG. 7 is an exploded perspective view of some components of the actuation device according to the present invention.

Designated by the reference number 100 in FIG. 7 is a device for selecting and moving actuation members of a gearbox. Components that are identical to those of the device 1 are designated by the same reference numbers and consequently will not be described again in so far as they are structurally and functionally identical.

The device 100 is contained within the casing 2, which is installed on the housing 3 of the gearbox 4.

As preliminary consideration, the device 100 is characterized, as compared to the device 1, by replacement of some components with similar components that differ for some structural modifications that render possible operation of a mechanism for the assistance to the engagement of the reverse gear RM. This mechanism for the assistance to the engagement of the reverse gear is designated as a whole by the reference number 101 and includes some components additional to the ones that make up the device 1.

In greater detail, the mechanism 101 includes:
a first rocker 102;
a second rocker 103; and
a disengageable locking member 104.
The member 104 in turn includes:
a pin 105 which bears at one end a double collar 106 and a stud 107, which projects from said collar 106 and is coaxial with the pin 105, wherein the collar 106 is comprised between the pin 105 and the stud 107 and comprises a first collar 106A adjacent to the pin 105 and a second collar 106B, which is adjacent to the stud 107 and has a diameter greater than that of the first collar 106A; and
an elastic element 108, preferably a helical spring, fitted on the stud 107 and set bearing upon the collar 106B.

The elements of the mechanism 101 just mentioned are mounted on a plate 155 that replaces the plate 55 described previously. The plate 155 is similar to the plate 55, from which it differs, however, as regards the following characteristics:

the eyelet 54 is replaced by an eyelet 154, which maintains the oblong shape in the direction of the axis X6 but now includes a first portion 154A and a second portion 154B, which has a width larger than that of the portion 154A by an amount denoted by the reference δ (see, in particular, FIGS. 8-13); and
it includes a flat wing 1550, which is set orthogonal and on which there is provided a fretted slot 1551 that reproduces the arrangement of the selection planes of the gearbox; it should be noted that, in the embodiment represented in the figure, the fretted slot 1551 reproduces the selection planes of a gearbox with six forward gear ratios instead of the five described previously; this, however, is perfectly compatible with the foregoing description in so far as operation of the selection and engagement device according to the invention is regardless of the number of forward gear ratios; it should moreover be noted that the fretted slot 1551 and the flat wing 1550 are not essential for operation of the mechanism 101, so that—in the case where design requirements were to dictate elimination thereof—they could be omitted without problems.

Like the plate, also the plate 155 is fixed to the casing 2 of the device 101.

Provided in the plate 155 are a first hole, a second hole, and a third hole designated by the reference numbers 109, 110, 111, housed in which are the following components:
a pin 112 by means of which the rocker 102 is mounted on the plate 155 in a rotatable fashion with respect to an axis 2102 and which is inserted in the hole 109; conveniently, the pin 112 is made with a shape similar to that of a rivet;

a pin 113 by means of which the rocker 103 is mounted on the plate 155 in a rotatable fashion about an axis Z, and which is inserted in the hole 110; conveniently, the pin 113 is made with a shape similar to that of a rivet; and the pin 105, which is slidably mounted within the hole 111 along an axis 2104 and projects beyond the plate 155.

The axes 2102, 2103, and 2104 are all parallel to one another and orthogonal to the axis X6.

The geometrical details of the rockers 102 and 103 will now be described.

With reference to FIG. 7 and to the subsequent FIGS. 8-13, the rocker 102 is substantially V-shaped, and includes a fork-shaped end 114 and an arm 115 with a cusp-shaped end 115A. Located at the fork-shaped end 114 is a further pin 116, which is also housed in a hole on the plate 155, which limits the rotary movement of the rocker 102 about the axis 2102.

The rocker 103 is, instead, substantially C-shaped and includes a first arm 117 having a rectilinear shape and a second arm 118 having a curved shape. In particular, the arm 118 is shaped so as to reproduce at least in part the profile of the collar 106A so that it bears upon the latter in an operative configuration of the mechanism 101, as will be described hereinafter.

Also forming part of the mechanism 101 is an abutment plate 119, which is substantially L-shaped and includes three holes 120, 121, 122 having a position such as to be coaxial with the holes 110, 109, 111, respectively.

In this way, the pins 113 and 112 can be housed also in the holes 120 and 121, thus fixing the plate 119 to the plate 155. The stud 107 is instead housed within the hole 122 with the possibility of axial movement with respect thereto. Fixing of the contrast plate 119 to the plate 155 provides a second contrast surface for the elastic element 108, which is in this way withheld between the collar 106B and the plate 119 itself, moreover keeping the collar 106A in contact with the plate 155 thanks to an action of elastic pre-loading.

Figure 7B:
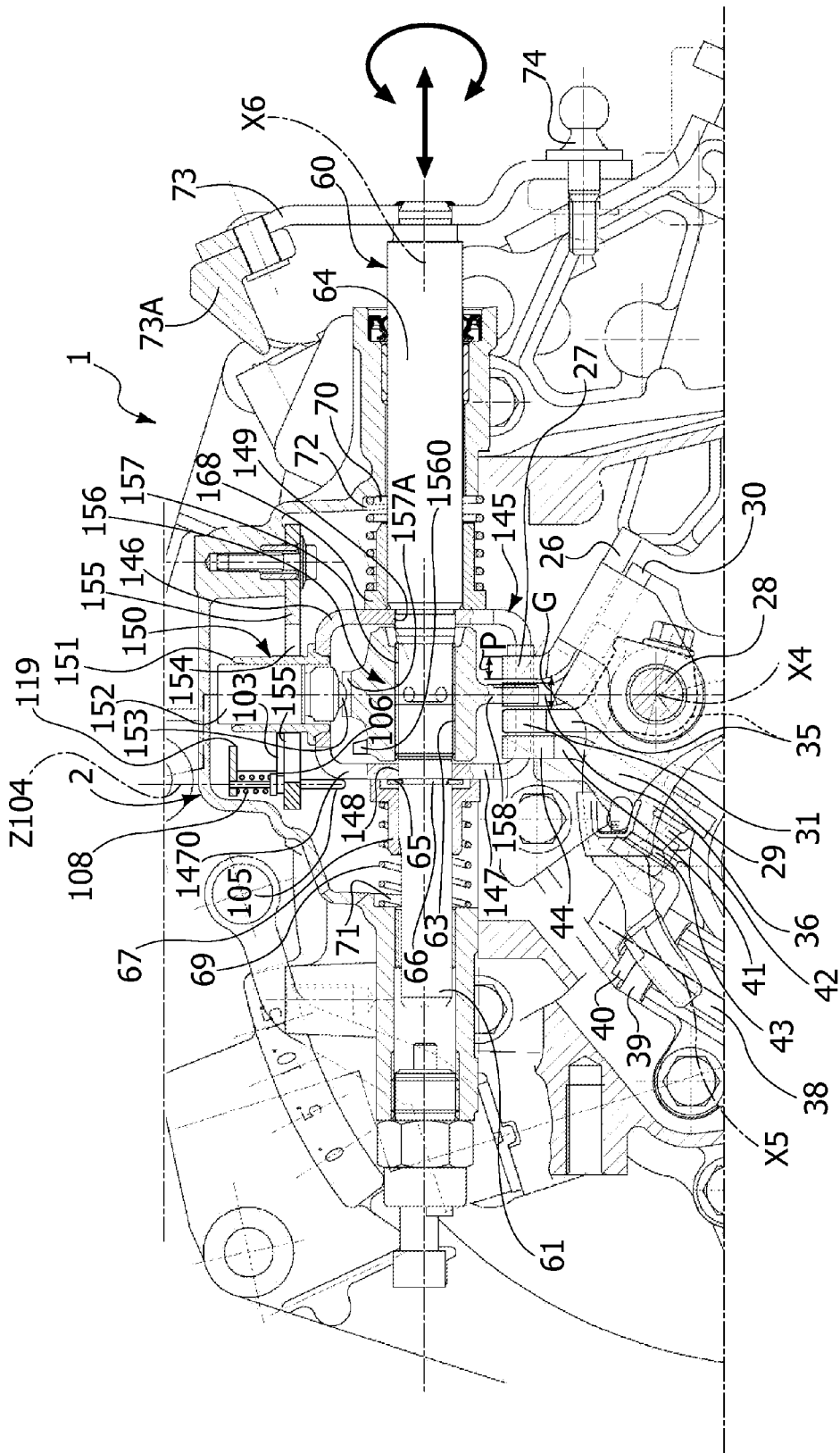
FIG. 7B is a cross-sectional view corresponding to that of FIG. 5, but illustrating the actuation device according to the invention.

With reference to FIGS. 7, 7A, and 7B, a selection mask 145 replaces the mask 45 described previously. The selection mask 145 has a structure and function substantially similar to those of the selection mask 45 and comprises two substantially L-shaped fingers 146, 147, opposite to and facing one another. The fingers 146, 147 converge and have ends separated by the distance G, of dimensions comparable to, but slightly larger than, the thickness P of the fork-shaped ends 27, 31, 36, 44. Each of the fingers 146, 147 is provided with a respective through hole 148, 149. The holes 148, 149 are coaxial to one another and are arranged so as to be coaxial to the axis X6. Moreover fixed to the selection mask 145 is a stud 150 comprising a bushing 151 containing a pin 152 with a head that withholds a retractile ball 153 projecting between the fingers 146, 147. These components are identical to those described in relation to the selection mask 45. Once again as in the case of the device 1, the stud 150 is engaged within the eyelet 154 and is slidable therein in the direction of the main axis X6. The eyelet 154 hence defines a guide path for the selection mask 145 that has a direction parallel to the axis X6. For this purpose, the portion 154A has a width D150 substantially equal (but for the play necessary for operation) to the diameter of the stud 150.

The finger 147 is moreover provided with a window 1470, which is configured for receiving the pin 105 of the locking member 104 when the manoeuvres of selection and engagement of the reverse gear are carried out (in this connection, the reader is referred to the ensuing functional description).

The engagement hub 56 is replaced by an engagement hub 156 including an engagement finger 158 provided for engaging with the actuation members 26, 30, 35, 41, in particular with the respective fork-shaped ends 27, 31, 36, 44. The engagement finger 158 is set between the two fingers 146, 147 in the area that separates the ends thereof and consequently has a thickness slightly smaller than the distance G.

The engagement hub 156 further comprises a pair of radial shoulders 159 substantially orthogonal to the engagement finger 158. All these elements are identical to the corresponding elements of the hub 56, and moreover the hub 156 also includes all the further elements of the hub 56 not explicitly referred to herein. In particular, the engagement hub 156 comprises an axial groove 157A similar to the groove 57A on the hub 56, which is engaged by the retractile ball 153 during operation of the device 100.

The only substantial difference between the hubs 56 and 156 lies in the provision on the latter of a cam 1560, which is provided at an axial end thereof and includes a trough portion V1 and a peak portion P1, which has an angular extension (with angle measured about the axis of the hub 156, i.e., the axis X6) greater than the first trough portion V1. The cam 1560 is provided at the axial end of the engagement hub that is set in a position closer to the fork-shaped end 44 associated to the reverse gear RM and is configured for co-operating with the locking member 104, in particular with the pin 105, in the course of a manoeuvre of engagement of the reverse gear RM.

As will be seen in what follows, the cam 1560 and the axial groove 157A form part of the mechanism 101.

Finally, preferably, a pin 1561 is fixed to the hub 156 and is mobile within the fretted slot 1551.

In particular, with reference to FIGS. 7A and 7B, the engagement hub 156 is inserted between the fingers 146 and 147, coaxially with respect to the through holes 148, 149, and is rotatably mounted about the main axis X6 being supported by the control shaft 60. It should moreover be noted how the position of the cam 1560 is such that the window 1470 is in its view.

The control shaft 60 is unchanged. Consequently, all the characteristics and the modalities of assembly referred to previously apply, but in any case be recalled for completeness.

The shaft 60 is arranged sharing the axis X6 and is fitted into the through holes 148, 149 and into the hub 156. In particular, the male splined coupling 63 is engaged in a female splined coupling 157 of the hub 156. In this way, the engagement hub 156 is permanently connected in rotation to the shaft 60, thanks to the coupling between the profiles 157, 63.

With reference to FIG. 7B, the control shaft 60 is axially blocked with respect to the selection mask 145 thanks to the stretch 64 having a diameter greater than that of the through holes 148, 149 and thanks to an elastic ring 65 engaged in an annular groove 66 on the first stretch 61.

The bushings 67, 68 are fitted on the stretches 61, 64, respectively, and are kept bearing upon the finger 147 and the finger 146, respectively, by springs 69, 70, which share the axis X6, are fitted on the control shaft 60, and are comprised between the corresponding bushings and the recesses 71, 72, which are provided on the casing 2.

With reference to FIG. 7B, the control shaft 60 is connected in rotation to the first control member 73, whilst the engagement hub 156 is operatively connected to the second control member 75 via the lever 77, which engages between the radial shoulders 159.

Operation of the device 100 will now be illustrated with the aid of FIGS. 8 to 13.

Each of these figures is divided into four portions associated to the letters A, B, C, D, corresponding, respectively, to views of the assembled device 100 according to the arrows A-x, B-x, C-x, and D-x of FIG. 7.

Each portion A represents the relative position between the fork-shaped ends 27, 31, 36, 44 and a set of components comprising the selection mask 145 and the engagement finger 158 of the engagement hub 156. In each portion A, moreover, indicated on each fork-shaped end 27, 31, 36, 44 is the pair of gear ratios that it is possible to engage.

Each portion B substantially represents a plan view of the mechanism for assistance 101 and of the eyelet 154.

Each portion C mainly illustrates the position of the pin 1561 within the fretted slot 1551 in order to provide a further indication as regards the relative position of the various components in the device 100. Also in this case, to facilitate understanding, provided on the fretted slot 1551 is an indication regarding the gear ratio that is engaged in the case where the pin 1561 comes to occupy an extreme position inside it.

Finally, each portion D mainly illustrates the relative position between the selection mask 145 and the engagement hub 156, as well as the position assumed by the locking member 104. It is to be noted that the portion D is associated—in FIGS. 10 to 13—to a further portion E that illustrates in detail the position of the locking member 104.

Figure 8A:
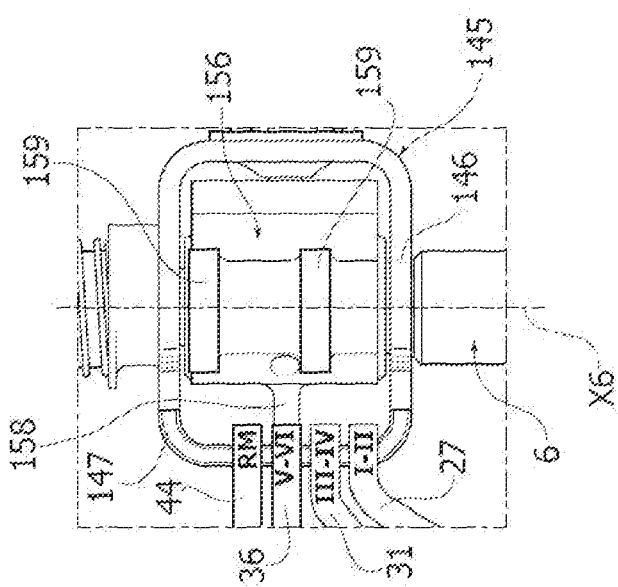

FIG. 8 illustrates an operative condition corresponding to the beginning of a manoeuvre of selection of the engagement plane of the reverse gear.

This is the result of an axial translation of the control shaft 60, of the selection mask 145, and of the engagement hub 156 in the axial direction along the axis X6 to bring the engagement finger 158 towards of the fork-shaped end 44 associated to the reverse gear ratio RM.

Axial movement of the control shaft 60 is obtained thanks to rotation of the second control member 75 about the axis Z1: via the lever 77 engaged between the radial shoulders 159, it is thus possible to govern translation of the engagement hub 156 and of the selection mask 145 along the axis X6.

Figure 1:
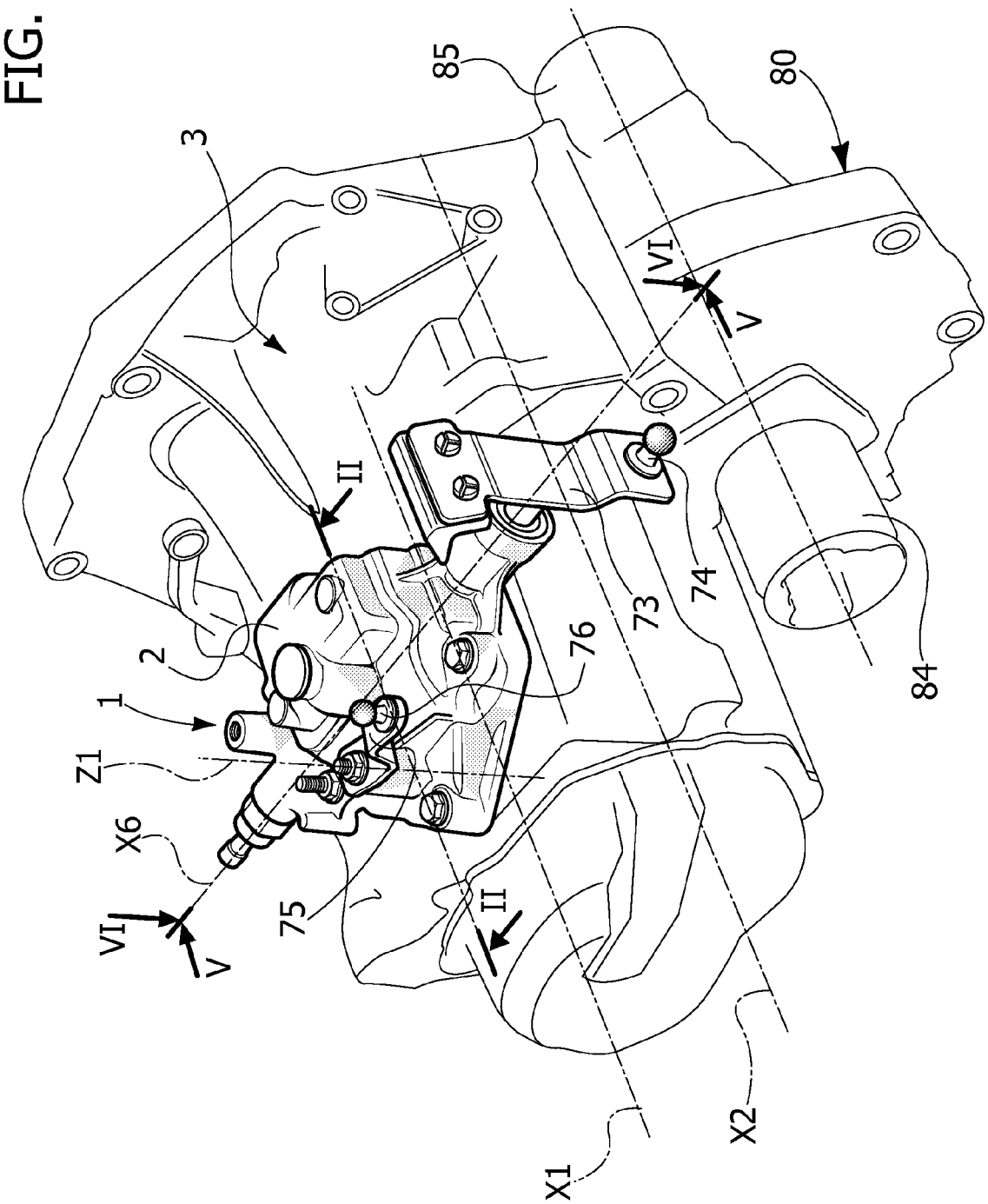
FIG. 1, described previously, illustrates a perspective view of an actuation device of a known type installed on a gearbox.
Figure 2:
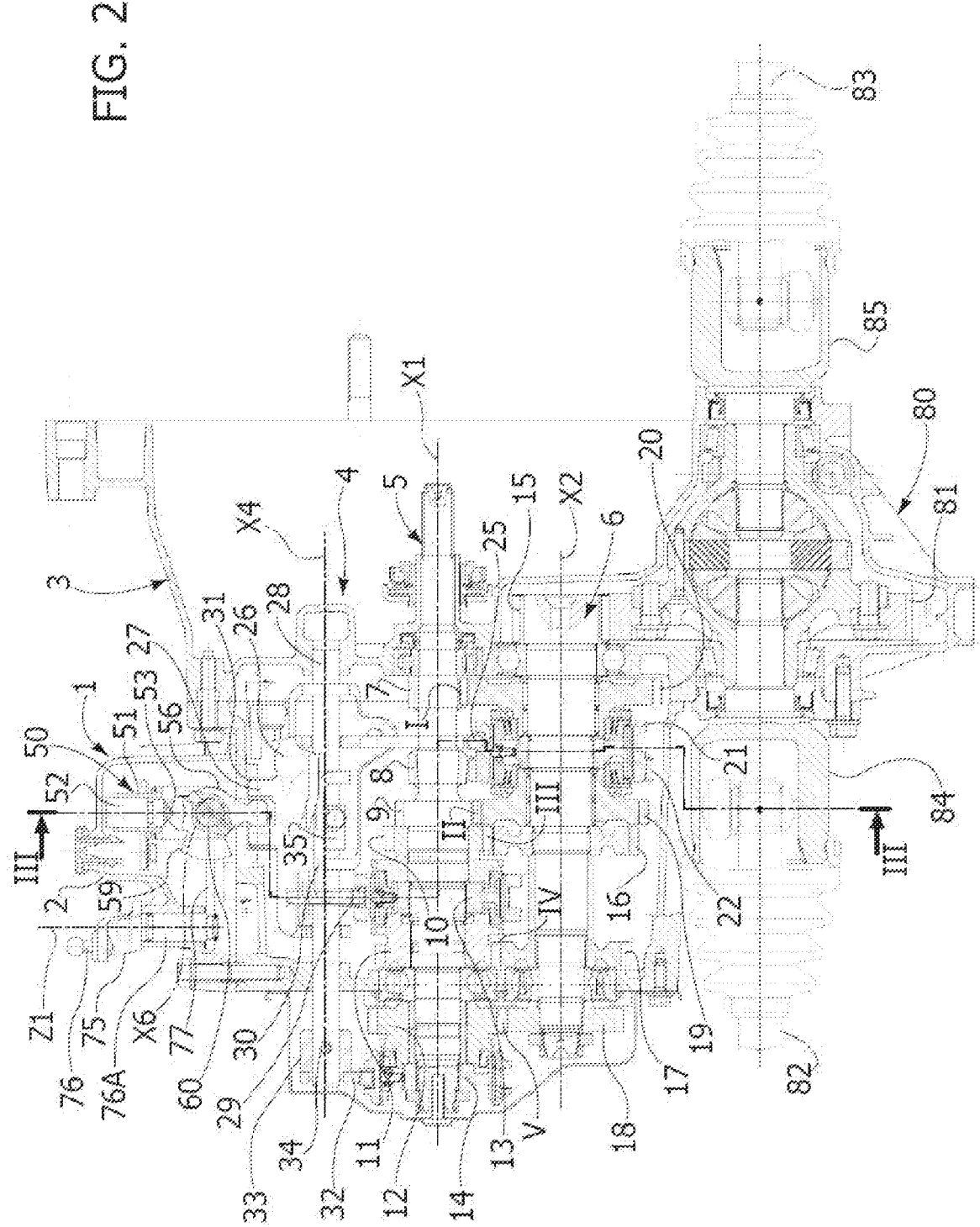
FIG. 2, described previously, is a cross-sectional view according to the trace II-II of FIG. 1.
Figure 3:
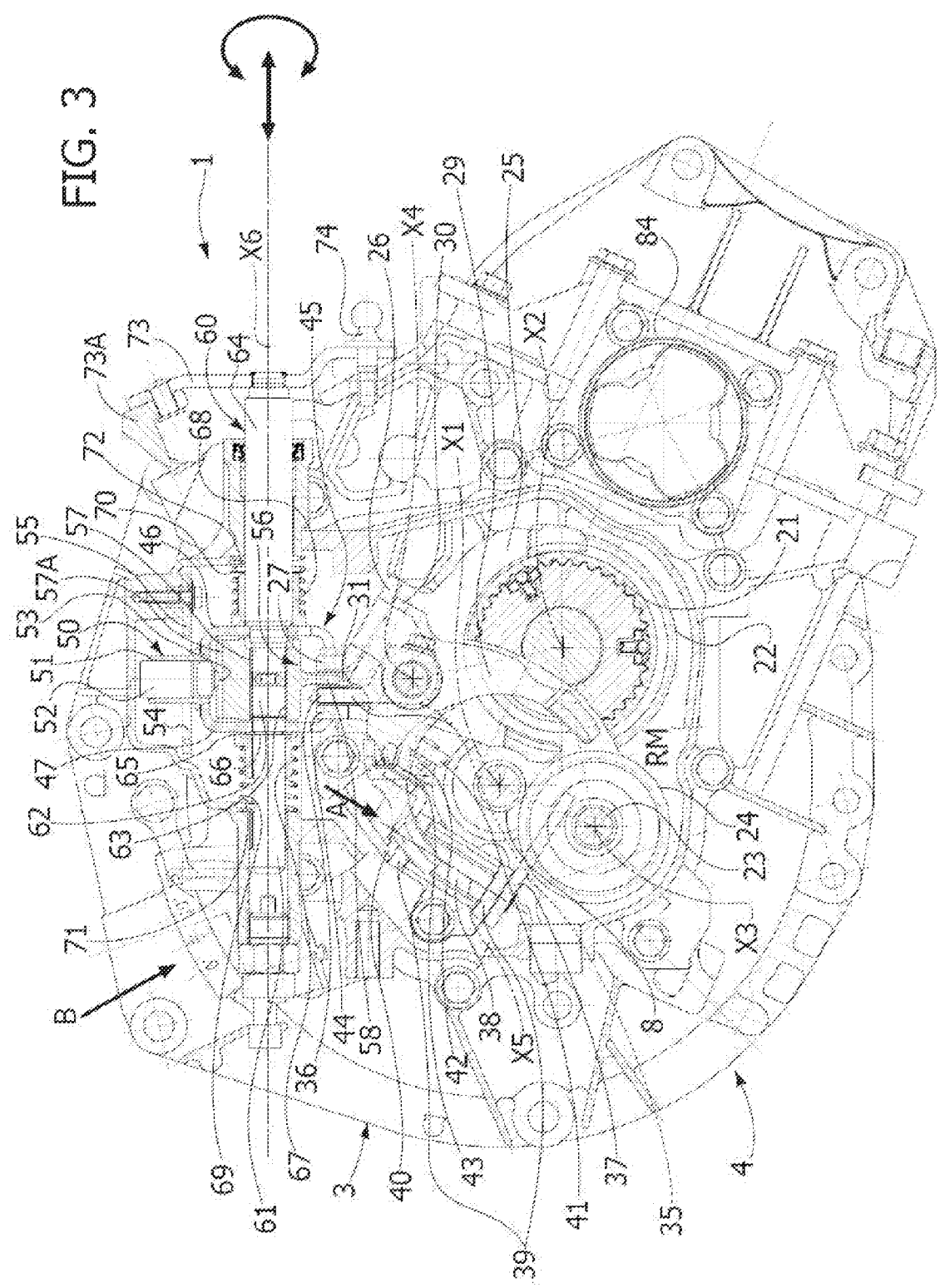
FIG. 3, described previously, is a cross-sectional view according to the trace III-III of FIG. 2 and with some components removed for clarity.
Figure 4:
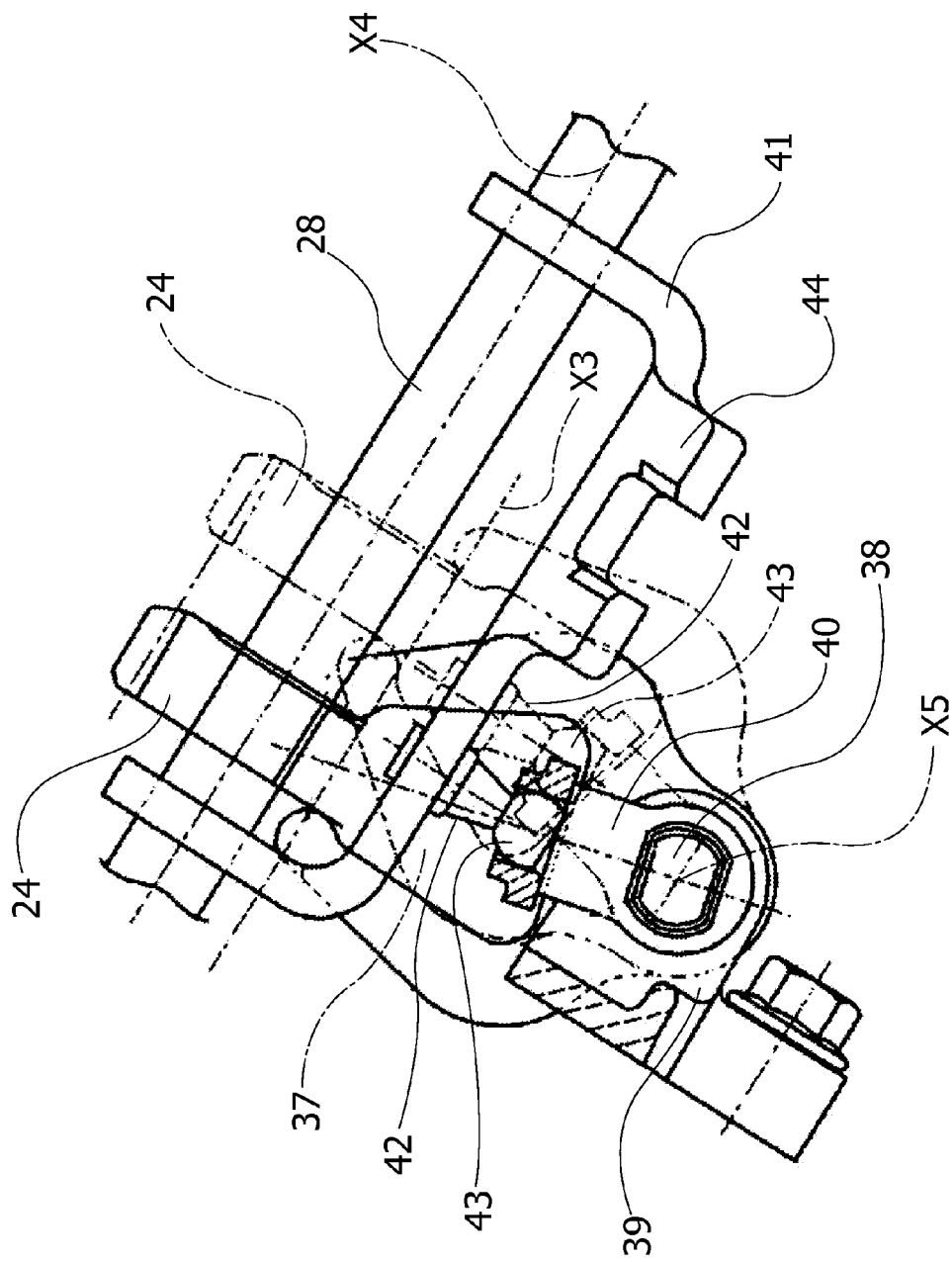
FIG. 4, described previously, illustrates a view according to the arrow A of FIG. 3.
Figure 5:
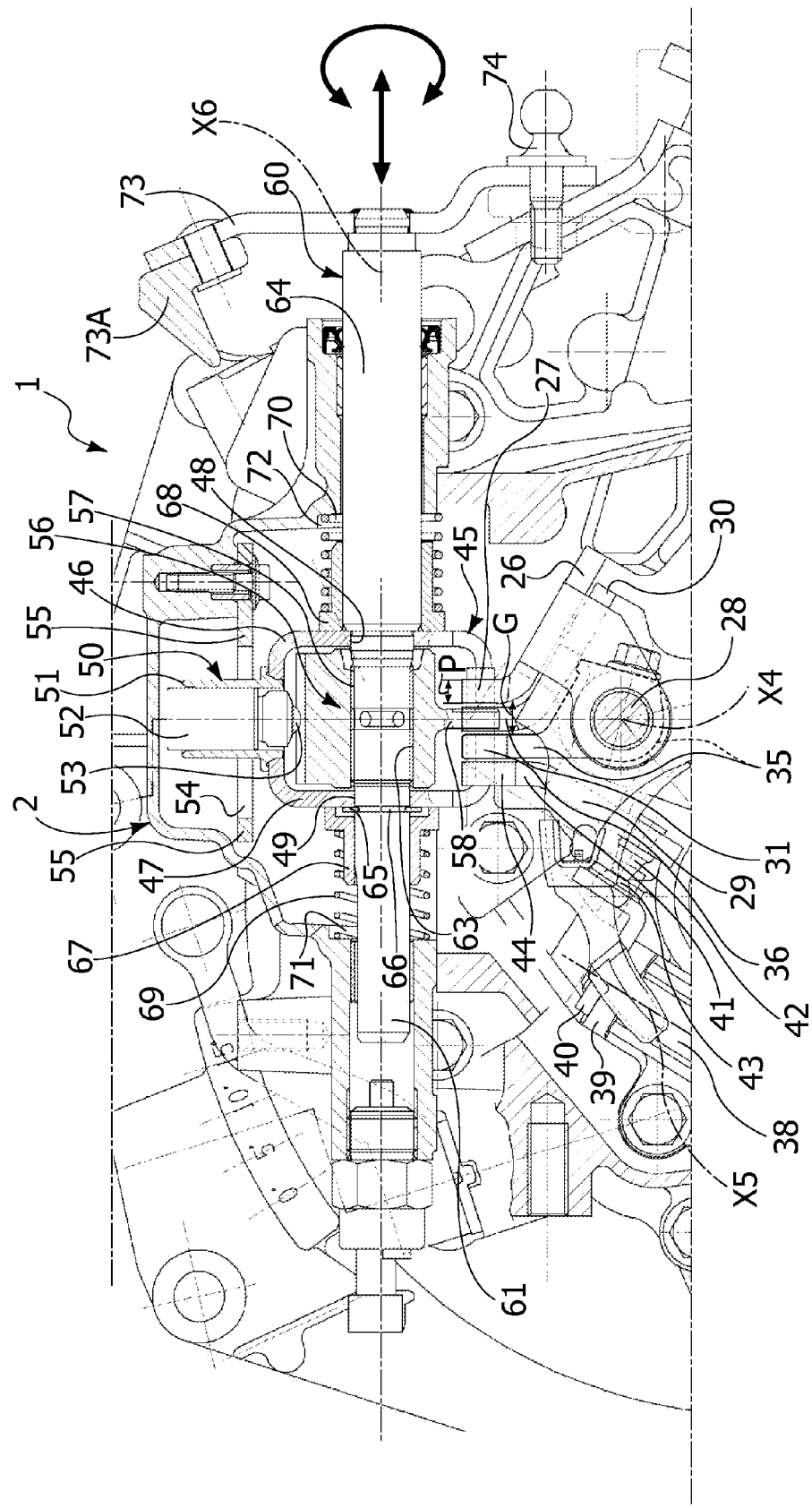
FIG. 5, described previously, is an enlarged cross-sectional view according to the arrow B of FIG. 3.
Figure 6:
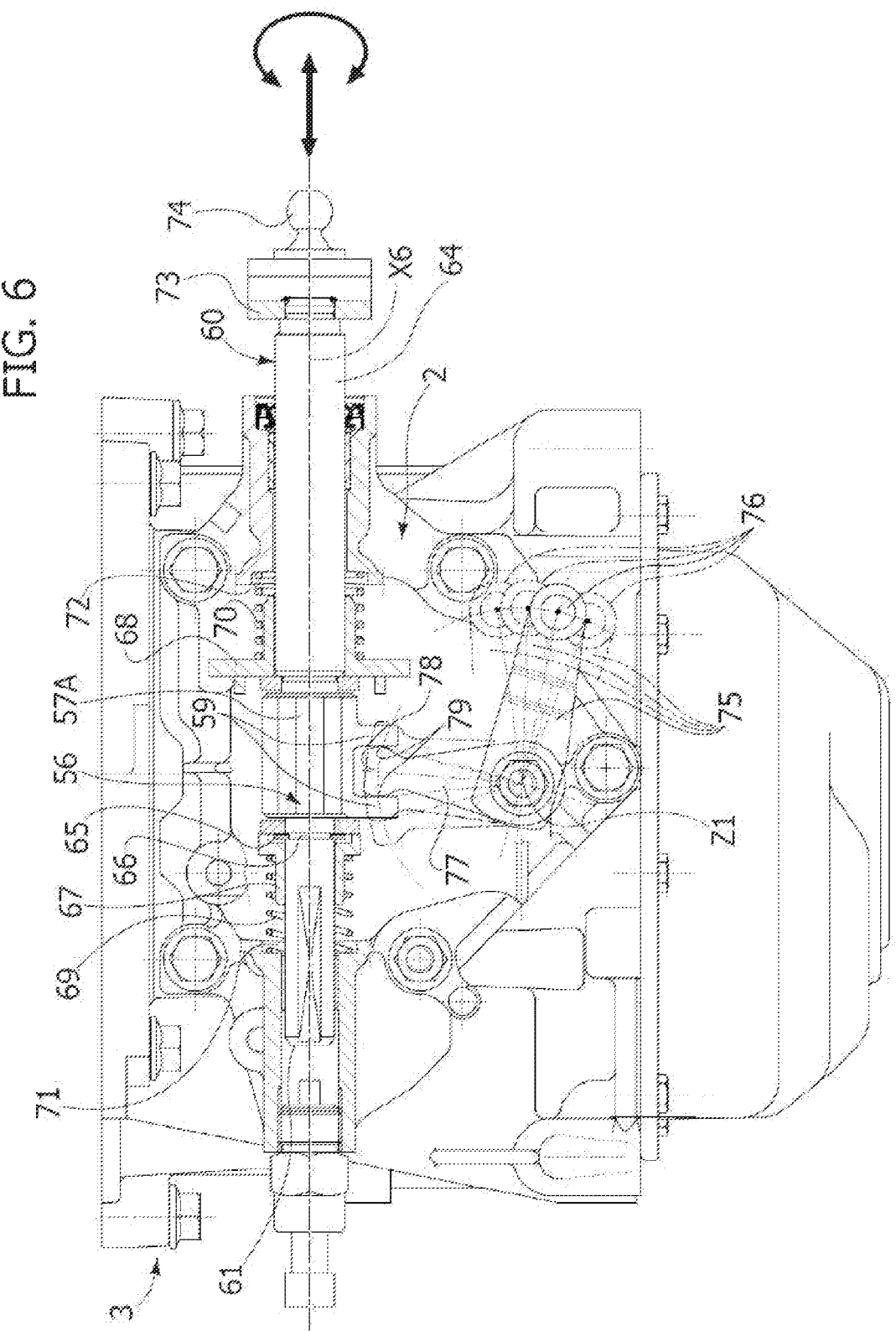
FIG. 6, described previously, is a cross-sectional view according to the trace VI-VI of FIG. 1.
Figure 8B:
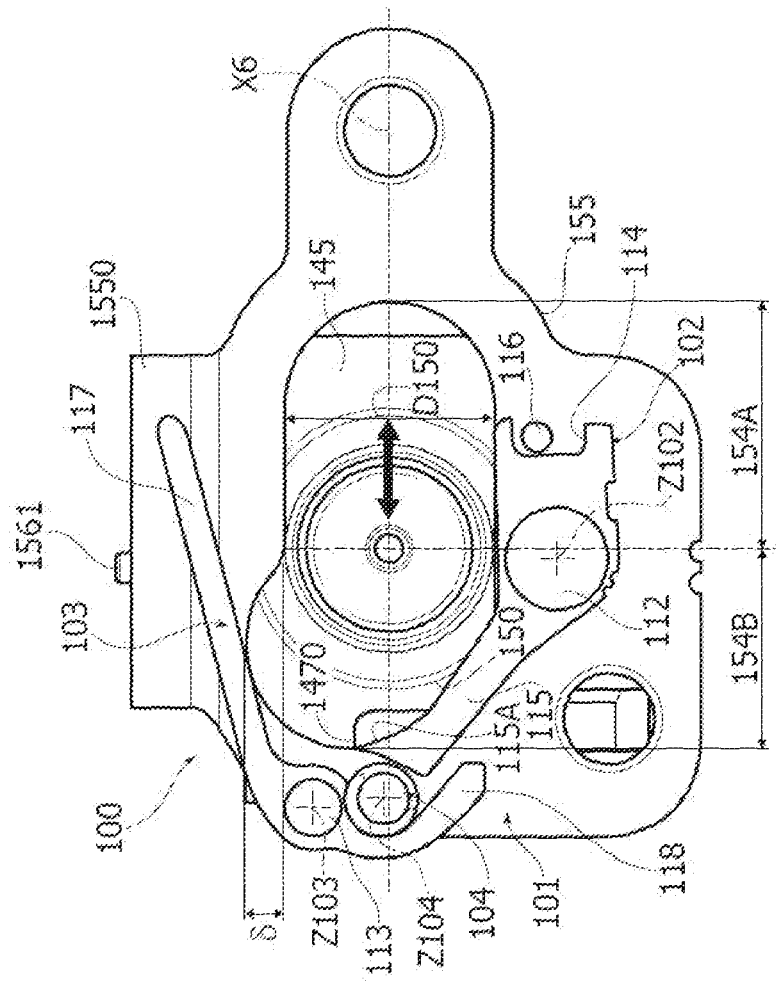

In the condition illustrated in FIG. 8, the engagement finger 158 is still in a position corresponding to the plane of selection of the fifth forward gear and the sixth forward gear (if this is present)—as on the other hand is evident also from the position of the pin 1561 with respect to the fretted slot 1551 (FIG. 4C), and it is useful to note how for any plane of selection other than that of the reverse gear there is no overlapping between the window 1470 in the selection mask 145 and the pin 105 of the locking member 104 (see in particular FIG. 8B).

Furthermore, as long as the engagement finger is in the engagement planes corresponding to the forward gear ratios, the stud 150 remains substantially within the portion 154A of the eyelet 154, which prevents rotation of the selection mask about the axis X6 upon actuation in rotation of the control shaft 60 and of the engagement hub 156 in so far as the eyelet 154 exerts an guiding action on the stud 150, which forces the latter to perform a translation in a direction parallel to the axis X6.

FIG. 9 illustrates a condition corresponding to the manoeuvre of selection of the reverse gear, in particular corresponding to translation of the engagement finger 158 (and of the hub 156 and of the mask 145 therewith) towards an extreme position preliminary to engagement of the reverse gear. In this condition, the mechanism for assistance 101 is in a first operative configuration, in which the rocker 102 assumes a position such that the arm 115 is in a condition of overlapping with the eyelet 154, in particular with the portion 154B thereof.

As may be seen in FIG. 9 (as likewise in FIG. 8), the rocker 102 thus sets up a deviation of the guide path of the selection mask 145 in such a way that, during axial travel of the engagement finger 158 towards the aforesaid extreme position preliminary to engagement of the reverse gear, the selection mask 145 is forced to move temporarily into a rotated position.

It should be noted in fact that the side of the eyelet 154 on the portion 154B, on the side where the rocker 102 is located, maintains the rectilinear geometry that characterizes the portion 154A, which is such as not to generate any deviation of the guide path of the selection mask 145 with respect to a direction parallel to the axis X6. In other words, the increase δ in the width of the eyelet 154 in the portion 154B enables rotation of the selection mask 145 providing space for accommodating the rotary movement of the stud about the axis X6, without, however, being able to generate this movement.

Rotation of the selection mask 145 is hence generated by the contact of the stud 150 with the side of the arm 115 facing the eyelet 154: this contact—as may be seen in FIG. 9—results in the assured rotation of the selection mask 145 and does not induce, instead, a counterclockwise rotation of the rocker 102 such as to reduce or eliminate overlapping of the eyelet 154 by the arm 115. The reason for this is that the cusp-shaped end 115A is shaped so as to bear upon the collar 106, in particular upon the collar 106B. The collar 106A is moreover kept in contact with the plate 155 by the action of the elastic element 108.

Seeing that the rocker 102 is in contact with the plate 155 at the level of the collar 106A, the end 115A and the collar 106B are set alongside and in contact with one another, so that the latter—which has a fixed position in the plane of the plate 155—constitutes in effect an arrest for the rocker 102.

As regards the rocker 103, in the first operative configuration, it can be arranged indifferently in the position of FIGS. 8 and 9 or in the position of FIG. 13: to generalize, in the first operative configuration, the rocker 103 is in a condition such that it can rotate freely—at least through a certain arc—about the axis Z103 in a counterclockwise direction (as viewed in the figure), i.e., in a direction that enables the arm 117 of the rocker 103 to move away from the eyelet 154 reducing or eliminating altogether the overlapping. In the positions of FIGS. 8, 9, and 13, the only member that limits counterclockwise rotation of the rocker 103 is the collar 106A of the locking member 104, upon which the arm 118 comes to bear.

The result of the rotation of the mask 145 induced by the mechanism 102 is such that the finger 146 of the selection mask 145 that is located within the fork-shaped ends 27, 31, 36 (see portions A of FIGS. 8 and 9) operates at least one of the actuation members of the forward gears of the gearbox.

It should moreover be noted that, as the selection manoeuvre proceeds, the window 1470 and the cam 1560 are progressively brought up to the pin 105, meeting up therewith upon completion of the selection manoeuvre itself.

The above condition is represented in FIG. 10, which corresponds precisely to the situation in which the manoeuvre of selection of the engagement plane of the reverse gear is concluded and the manoeuvre of engagement of the reverse gear is imminent. Some significant facts may in fact be noted.

i) The stud 150 is located at the end of the eyelet 154 and has encroached into the area thereof corresponding to the increase in width δ (FIG. 10B). This means that the selection mask 145 is rotated through an angle β with respect to the axis X6, as may be seen in FIG. 10D.

ii) The cam 1560 is located in an axial position such that it engages the pin 105 in the trough portion V1; the depth of the trough portion V1 in the radial direction is such that the pin 105 is accommodated in the portion V1 without undergoing any displacement along the axis 2104 (FIG. 10E).

iii) Coupling of the pin 105 and of the cam 1560 is possible thanks to the window 1470, which moves completely into a position corresponding to the pin 105 when the manoeuvre of selection of the reverse gear is concluded. The window 1470 is, instead, always in a position corresponding to the cam 1560 since the relative position of the selection mask 145 and of the engagement hub 156 in an axial direction is fixed.

iv) In the condition corresponding to FIG. 10, the selection mask 145 substantially achieves the maximum possible deviation with respect to the rectilinear guide path that it could have in the absence of the mechanism 101; this corresponds also to the maximum actuation imparted on the actuation members of the second, fourth, and sixth forward gears (fork-shaped ends 27, 31, 36) by the finger 146, this causing arrest of the rotation of the primary shaft 5 of the gearbox and consequently enables a subsequent regular and silent engagement of the reverse gear.

The braking effect on the primary shaft 5 is due to the fact that the action on the actuation members of the second, fourth, and sixth forward gears results in a corresponding action on the respective synchronizers. Given that the secondary shaft of the gearbox is permanently connected to the drive wheels of the vehicle, which are stationary at the moment of selection of the reverse gear RM, it will likewise be stationary. The result of the action of synchronization is, in fact, that of synchronizing the speed of the shafts as a function of a transmission ratio existing in the corresponding gears, but given that the secondary shaft is stationary, the only condition that enables synchronization is precisely arrest of the primary shaft 5 (for all the forward gears on the actuation members which action is carried out). With both shafts of the gearbox stationary, engagement in an axial direction of the idle gear wheel 24 can occur without any jamming whatsoever.

v) It should be noted that, in order to achieve the foregoing, it is necessary to size the rocker 102 so as to impose a rotation on the selection mask 145 that will result in an action on the synchronizers of the second, fourth, and sixth forward gears sufficient to complete just the synchronization step, but not the step of engagement of the forward gears for obvious reasons of safety with respect to the structural integrity of the transmission. The action exerted on the fork-shaped ends 27, 31, 36 may be seen in FIG. 10D, where the ensemble of the aforesaid fork-shaped elements is represented by a dashed line.

Once again to preserve integrity of the transmission and, in particular, of the synchronizers there is the need to bring the selection mask back with respect to the guide path directed along the axis X6, recalling the selection mask from the rotated (and deviated) position imposed by the rocker 102, if it is desired to complete the manoeuvre of engagement of the reverse gear RM. Return of the selection mask 145 is obtained by means of the action of the retractile ball 153 on the groove 157A, which occurs simultaneously with start of the engagement step.

The rotation about the axis X6 imparted on the hub 156 causes the groove 157A to perform a relative movement with respect to the retractile ball 153, which causes disengagement of the groove 157A from the latter. In this way, the ball 153 will no longer bear upon the groove 157A, but rather upon one of the walls that delimit it. Both of the walls that delimit the groove 157A are inclined so that contact with the ball 153 results in the exchange of tangential forces (assuming as reference the axis X6) that induce a torque capable of bringing the selection mask back into a non-deviated position. This explains, among other things why also the groove 157A and the ball 153 form in effect part of the mechanism 101.

In this regard, it should be noted that in order to enable return of the selection mask 145 into a position aligned to the guide path it is also necessary to remove the obstacle constituted by the rocker 102. This would require turning of the rocker 102 itself in a counterclockwise direction (once again as viewed in the figure), which is not possible as long as the collar 106A is in contact with the plate 155 and, as a result, the collar 106B hence functions as arrest with respect to the rocker 102 itself.

Figure 11B:
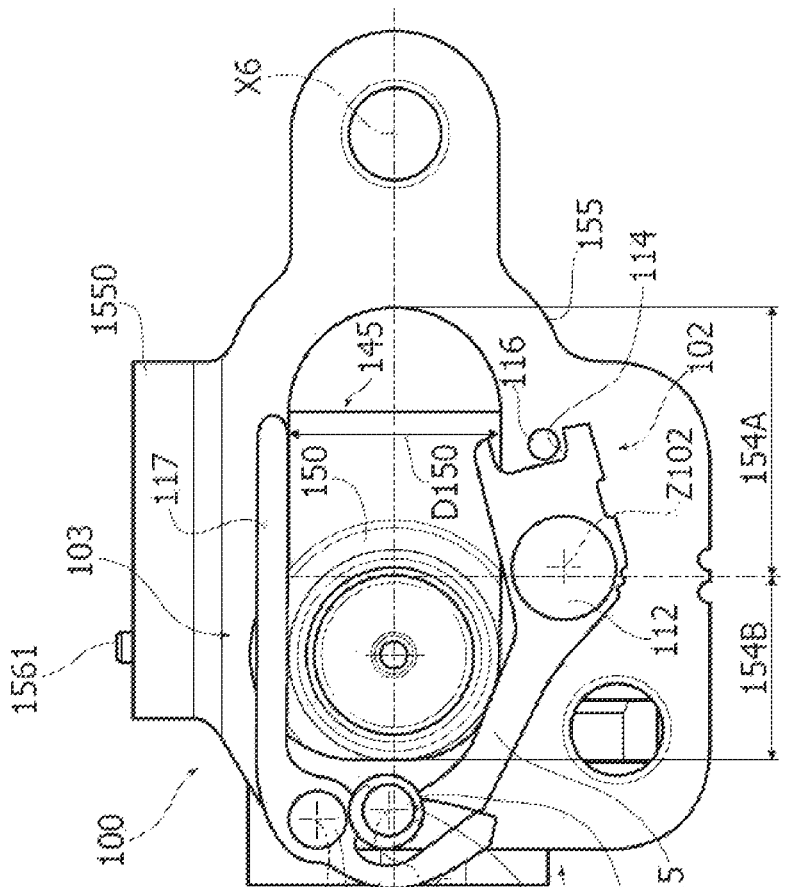
Figure 11A:
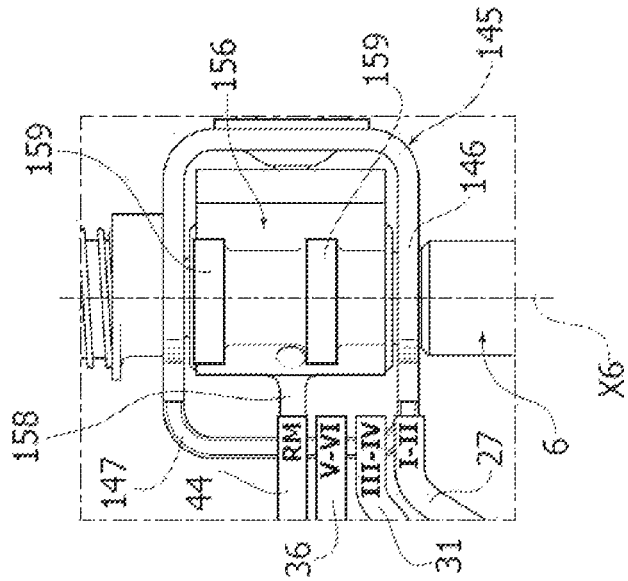
Figure 13B:
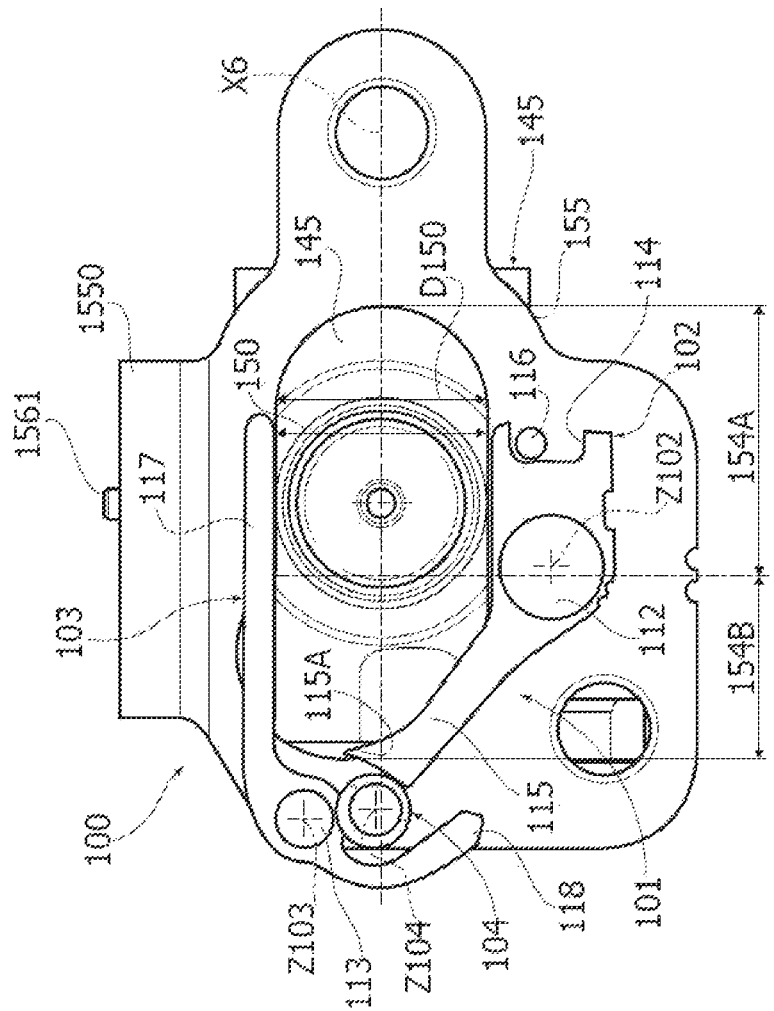
Figure 13A:
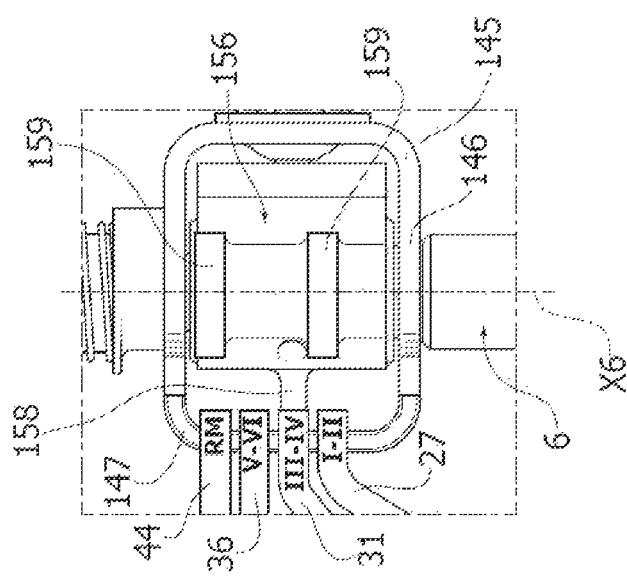
Figure 13D:
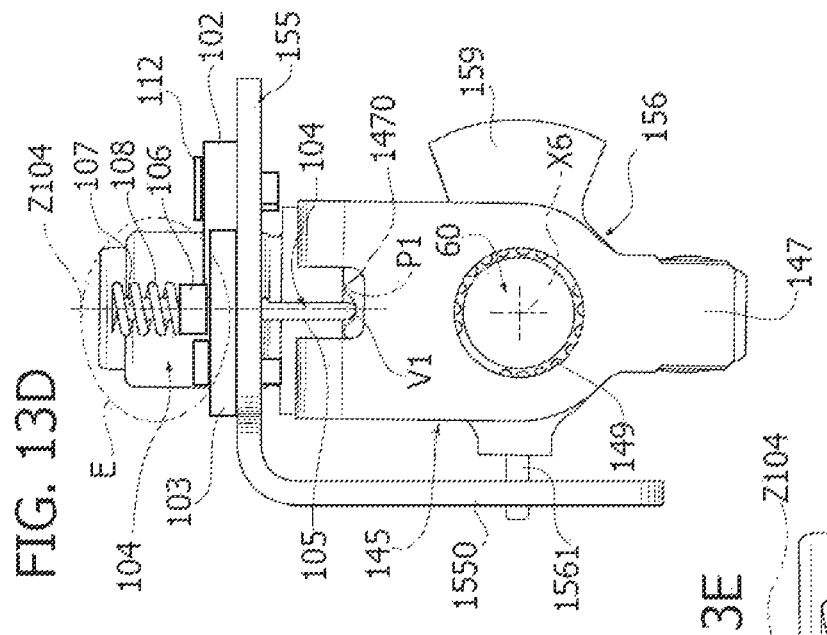
Figure 13E:
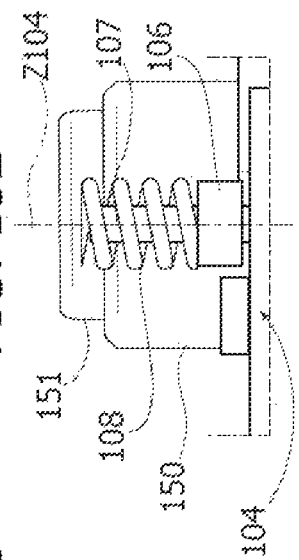
Figure 13C:
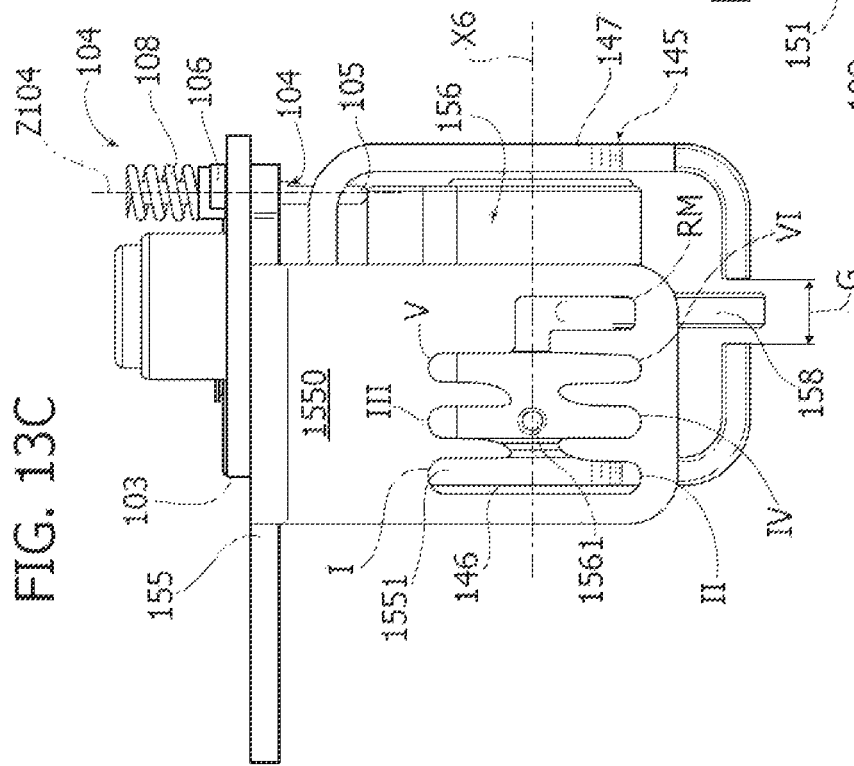

FIG. 11 illustrates in particular the step of beginning of engagement of the reverse gear RM by means of rotation of the engagement hub 156. This rotation, as in the case of the device 1, is governed via actuation in rotation of the first control member 73 about the axis X6, which results in the corresponding rotation of the control shaft 60 (see FIG. 7B). In this condition, moreover, the window 1470 is completely in contact with the pin 105 so that the cam 1560 engages the latter completely thereby rendering possible actuation thereof. The depth in a radial direction of the trough portion V1 is moreover such as to enable axial alignment (along the axis X6) of the pin 105 and of the cam 1560 without there being any interference between them in order to prevent any jamming of the system and/or any undesirable actuation of the pin 105.

As may be noted from FIG. 11D in combination with FIG. 7, the rotation imposed on the engagement hub 156 is such as to bring the peak portion P1 of the cam 1560 into a position corresponding to the pin 105, determining axial displacement thereof along the axis 2104, which raises the collar 106 from the plate 155. The peak-to-trough distance between the bottom of the portion V1 and the crest of the portion P1 is chosen in such a way as to determine an axial displacement of the pin 105 against the action of the elastic element 108 greater than the axial extension of the area of contact between the collar 106B and the rocker 102. This enables the latter to override the locking member 104 by sliding underneath the collar 106B, as far as into the position of FIG. 11. It should be noted that:

the rocker 102 is pushed towards the position of FIG. 11 at least in part by the resistant action transmitted by the synchronizers, which are set downstream of the kinematic chain; and the rocker 102 can slide underneath the collar 106B by virtue of the smaller diameter of the collar 106A, which is not able to oppose any contrast to the end 115A.

Rotation in a counterclockwise direction of the rocker 102 after it has overridden the locking member 104 is moreover such as to cause rotation in a clockwise direction of the rocker 103. In this connection, it should be noted that, once the arm 115 has overridden the member 104, it acts on the arm 118 bringing about rotation of the rocker 103 that has as result that of contributing to return of the selection mask 145, which is realigned with the guide path directed along the axis X6, and that of overlapping the eyelet 154, thus determining an overall geometry thereof identical to that of the eyelet 54, i.e., with a constant width D150 equal (but for the play necessary for operation) to the diameter of the stud 150. This width, as will be appreciated, is proper only to the portion 154A and can be imposed on the portion 154B only thanks to the rectilinear geometry of the arm 117.

The above prevents any accidental actuation of the synchronizers of the second, fourth, and sixth forward gears during reverse of the vehicle. The foregoing corresponds to a second operative configuration (of recall) of the mechanism 101.

The final condition reached at the end of the manoeuvres of engagement of the reverse gear RM may be seen in FIG. 12. The arm 115 of the rocker 102 is completely away from the eyelet 154, and the end 115A keeps the rocker 103 firmly in the recall position, and rotation of rocker 103 about the axis 2103 is completely prevented on the one hand by the rocker 102 and on the other by the stud 150.

The fork-shaped ends 27, 31, 36, once again represented with a dashed line, are now in the neutral position, whereas the fork-shaped end 44 is in an extreme position corresponding to engagement of the reverse gear RM.

It should moreover be noted that the rocker 102 is turned at this point so that the fork-shaped end 114 is set partially facing the inside of the area of the eyelet 154 and is moreover in contact with the pin 116, which prevents any further displacement thereof. The fact that the fork-shaped end is inside the eyelet 154 is fundamental for obtaining a subsequent recall of the rocker 102 towards the position that characterizes the first operative configuration of the mechanism 101.

The pin 105 is, in turn, located in the peak portion P1 of the cam 1560, which thus keeps it in a raised position with respect to the plate 155.

Finally, FIG. 13 illustrates the condition of the device 100 after the reverse gear has been disengaged and the gearbox has been brought back into the neutral position, which corresponds, among other things, to a location of the engagement finger 158 in a position corresponding to the engagement plane of the third and fourth forward gears.

To reach the condition illustrated in FIG. 13 it is necessary to drive the engagement hub 156 in rotation in a direction opposite to that of engagement of the reverse gear RM, which implies a new alignment between the trough portion V1 of the cam 1560 and the pin 105. However, in this condition, the pin 105 does not return into the lowered position, i.e., with the collar 106A in contact with the plate 155, but remains in a position that is in any case raised since the collar 106B pinches the rocker between itself and the plate 155. In this way, the end 115A of the rocker 102 is prevented, by definition, from bearing upon the collar 106B, thus enabling free rotation of the rocker 102 itself about the axis 2102. This explains, among other things, why also the cam 1560 forms in effect part of the mechanism 101.

Once the neutral position is reached, the engagement hub 156 is then translated axially until it reaches the idle position. By so doing, the stud 150 comes to act on the fork-shaped end 114 causing rotation of the rocker 102 in a clockwise direction, bringing it back into the position corresponding to the first operative configuration of the mechanism 101. In general, during this operation the rocker 102 is still pinched under the collar 106B, but the force with which translation of the selection mask 145 is governed is such as to enable disengagement of the rocker 102, which simply slides underneath the collar 106B freeing itself therefrom.

This moreover enables the pin 105 to move back into the lowered position, in which the collar 106A is in contact with the plate 155.

The locking member 104 then returns into its resting position, thus keeping the rocker 102 in the position illustrated in FIG. 13 (as in FIGS. 8 and 9) thanks to the restored contact with the cusp-shaped end 115A.

It should moreover be noted that the V shape of the rocker 102 is functional for interaction with the stud 150, both for providing the deviation with respect to the guide path and for bringing the mechanism 101 back into its initial position.

Finally, as regards the rocker 103, it can indifferently remain in the condition of FIG. 13 or in that of FIGS. 8, 9. In either of these cases, it is free to perform a counterclockwise rotation that will bring it to free the area occupied by the portion 154B.

The actuation device 100 according to the present invention can be installed on any gearbox of a known type and possibly already under mass production without any modification being required.

It in fact shares almost all the components with the actuation device 1, except for:
  the engagement hub 156;
  the selection mask 145;
  the plate 155; and
  the additional components of the mechanism for assistance, which, however, correspond to mechanical parts that can be obtained at a very limited cost with standard blanking operations (rockers 102, 103 and abutment plate 119) and turning (pin 105).

Furthermore, the components just mentioned that replace the corresponding ones of the actuation device 1 are configured as minimal modifications of standard-production components (i.e., those of the device 1 of a known type), which consist, for example, of:
  provision of holes for assembly of the rockers 102, 103 and for the locking member 104;
  local widening of the eyelet 154, which can be provided, for example by means of further milling operation;
  opening of the window 1470 in the selection mask 145, which can also be obtained with a simple milling operation; and
  machining of the cam 1560, which again can be obtained with a standard uniaxial milling operation.

It will moreover be appreciated that all the additional components of the mechanism for the assistance to the engagement of the reverse gear are arranged within the casing 2, and hence in a perfectly accessible position (the casing 2 is a component that can be separated from the housing 3 of the gearbox 4). Furthermore, it is possible to use a normal-production casing 2, without the need to redesign a specific one or—even worse—to redesign the housing of the gearbox.

It is thus clear that these features assume a particular value in a context of mass production, since it is possible, with negligible economic impact, to provide an actuation device that eliminates the problems linked to engagement of the reverse gear ratio without the need to redesign or modify the gearbox 4 substantially.

Of course, the details of construction and the embodiments may vary widely with respect to what has been described and illustrated herein, without thereby departing from the scope of protection of the present invention, as defined of the annexed claims.

For instance, in the embodiment described herein actuation of the synchronizers of the forward gears during the manoeuvre of selection of the reverse gear involves the even gears (II, IV, VI) on account of how the position of engagement of the reverse gear is located with respect to the positions of engagement of the forward gears. In the case where the reverse gear were to have a position of engagement located differently (for example, alongside the plane of selection of the first and second gears, with engagement in the direction of the first gear), the synchronizers of the first, third, and fifth gears could be operated possibly via the finger 146 instead of the finger 147.

This would require re-locating the window 1470 (which is located in the finger that does not operate the synchronizers of the forward gears during selection of the reverse gear) on the finger 147 and setting the cam 1560 at the opposite end of the hub 156, consequently relocating also the mechanism 101.

What is claimed is:

1. A device for selection and displacement of actuation members of a gearbox for motor vehicles comprising a plurality of forward gear ratios and a reverse gear ratio each associated to a respective actuation member, the device comprising:
 a selection mask having a pair of fingers opposite to one another and facing one another and a pair of through holes provided on said fingers and having axes which are coaxial and which define a main axis,
 an engagement hub inserted between said fingers in a manner coaxial to said through holes, said engagement hub having an engagement finger configured for engaging with said actuation members and being rotatable around said main axis,
 a control shaft inserted within said through holes and into said engagement hub, said control shaft being rotatable around said main axis and axially movable along the latter, said control shaft being furthermore connected in rotation to said engagement hub,
 a first control member connected in rotation to said control shaft and operable to cause a rotation of said engagement hub around said main axis to selectively displace each actuation member towards an extreme position thereof,
 a second control member operatively connected to said engagement hub and operable to cause a translation of said engagement hub and said selection mask along said main axis to select the actuation member wherein said engagement finger is to be engaged,
 a mechanism for assistance to engagement of reverse gear that can be activated when said engagement hub is translated to engage the engagement fingers into the actuation member of said reverse gear,
 a guide arrangement defining a guide path for said selection mask and configured to guide the selection mask so that the latter does not follow rotation of the control shaft and engagement hub when a gear is engaged,
 the device being characterized in that said mechanism for assistance includes:
  a first operative configuration wherein said mechanism for assistance is configured for setting up a deviation of the guide path so that during an axial travel of the engagement finger towards an extreme position preliminary to the engagement of the reverse gear, the selection mask is forced to be temporarily displaced in a rotated position, wherein one of the fingers of the selection mask actuates at least one of the actuation members of the forward gears of the gearbox, so as to cause a halt of the rotation of the primary shaft of the gearbox and accordingly allow a subsequent regular and silent engagement of the reverse gear, and
  a second operative configuration wherein said mechanism for assistance is configured for recalling said selection mask from said rotated position that resulted from action of the said mechanism for assistance in the first operative configuration.

2. The device according to claim 1, including a plate fixed to a casing inside of which said device is housed, and in turn including said guide arrangement of said selection mask.

3. The device according to claim 2, wherein said guide arrangement includes an eyelet having an oblong shape in a direction of said main axis and including a first portion and a second portion having increased width with respect to said first portion.

4. The device according to claim 3, wherein said selection mask includes a stud engaged into said eyelet and slidable therein along a direction of said main axis, wherein said eyelet has a width substantially equal to a diameter of said stud in correspondence of said first portion.

5. The device according to claim 4, wherein said mechanism for the assistance to the engagement of the reverse gear includes:
 a first rocker,
 a second rocker, and
 a disengageable locking member,
 said first rocker, second rocker and locking member being mounted on said plate.

6. The device according to claim 5, wherein said first rocker has a substantially V-shape, and includes a first fork-shaped end and an arm with a second, cusp-shaped, end, said first rocker being mounted on said plate in a rotatable manner with respect to a corresponding axis.

7. The device according to claim 6, wherein the second rocker is substantially C-shaped and includes a first arm having a rectilinear shape and a second arm having a curved shape, said second rocker being mounted on said plate in a rotatable manner with respect to a corresponding axis.

8. The device according to claim 7, wherein the locking member includes:
 a pin terminating with a double collar and a stud protruding from said double collar and coaxial to the pin, and
 an elastic member, preferably a helical spring, fitted on the stud and arranged in abutment on the double collar.

9. The device according to claim 8, wherein:
 said double collar includes a first and a second collar, wherein the second collar is adjacent to said stud and has a diameter greater than said first collar, said first collar being adjacent to said pin,
 said elastic member is in abutment on said second collar at a first end thereof, and on an abutment plate at a second end thereof, the abutment plate being fixed to said plate,
 said first collar is maintained in contact with said plate by said elastic member, and
 wherein said pin is slidably mounted along a respective axis within through holes provided on said plate and on said abutment plate.

10. The device according to claim 9, wherein the arm having a curved shape of said second rocker is shaped to copy at least in part the profile of the first collar of said locking member so as to come into abutment thereon in an operative configuration of the mechanism for the assistance to the engagement of the reverse gear.

11. The device according to claim 10, wherein said engagement hub includes a cam provided at an axial end thereof, said cam being configured for cooperating with said locking member during an engagement maneuver of the reverse gear.

12. The device according to claim 11, wherein said cam includes a valley portion and a peak portion.

13. The device according to claim 12, wherein said selection mask comprises a window provided on one said fingers, said window being in view of said cam and being furthermore configured to house the pin of the locking member upon the occurrence of the selection and engagement maneuvers of the reverse gear.

14. The device according to claim 9, wherein in the first operative configuration of the mechanism for the assistance to the engagement of the reverse gear the first rocker is in an overlapping condition with said eyelet, in particular with the second portion thereof, thereby setting up a deviation of the guide path of the selection mask.

15. The device according to claim 13, wherein in the second operative configuration of the mechanism of the assistance to the engagement of the reverse gear, the cam on the engagement hub performs a lifting of the pin of the locking member that lifts said collar with respect to said plate, thereby allowing said first rocker to override the locking member by eliminating the overlapping condition with the eyelet and by controlling a rotation of the second rocker which results in an overlap of the latter with said eyelet that determines a constant width geometry thereof and equal to the diameter of the stud of said selection mask.

* * * * *